United States Patent
Yokota et al.

(10) Patent No.: US 7,155,108 B2
(45) Date of Patent: *Dec. 26, 2006

(54) RECORDING MEDIUM EDITING APPARATUS BASED ON CONTENT SUPPLY SOURCE

(75) Inventors: Teppei Yokota, Chiba (JP); Nobuyuki Kihara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/058,552

(22) Filed: Feb. 15, 2005

(65) Prior Publication Data

US 2005/0158033 A1 Jul. 21, 2005

Related U.S. Application Data

(63) Continuation of application No. 09/692,913, filed on Oct. 20, 2000, now Pat. No. 6,907,184.

(51) Int. Cl.
H04N 5/93 (2006.01)
H04N 5/85 (2006.01)

(52) U.S. Cl. .................. 386/52; 386/125; 386/124

(58) Field of Classification Search ............. 386/52, 386/46, 124, 125, 126, 45, 35, 4, 1, 40, 83, 386/95, 96; 360/13, 32, 15; H04N 5/93, H04N 5/85

See application file for complete search history.

(56) References Cited

U.S. PATENT DOCUMENTS

| 4,885,632 | A | | 12/1989 | Mabey et al. |
| 5,469,270 | A | * | 11/1995 | Yamamoto ................. 386/55 |
| 5,541,738 | A | | 7/1996 | Mankovitz |
| 5,907,446 | A | | 5/1999 | Ishii et al. |
| 6,748,485 | B1 | | 6/2004 | Yokota et al. |

FOREIGN PATENT DOCUMENTS

| DE | 4108728 | 9/1992 |
| EP | 0 919 929 | 6/1999 |
| EP | 0 933 919 | 8/1999 |
| WO | WO 98 31010 | 7/1998 |
| WO | WO 99 28897 | 6/1999 |

* cited by examiner

*Primary Examiner*—Robert Chevalier
(74) *Attorney, Agent, or Firm*—Frommer Lawrence & Haug LLP; William S. Frommer

(57) ABSTRACT

An editing apparatus wherein the editing of content is controlled according to its supply source. Identification information identifying a content supply source is recorded in a recording medium in correspondence with the content supplied from the content supply source and recorded in the recording medium. When editing of the content is requested by a user, the identification information corresponding to that content is checked. According to the content supply source identified by the identification information, the editing content is enabled or disabled.

14 Claims, 24 Drawing Sheets

CC

| BIT | MEANING | | VALUE | |
|---|---|---|---|---|
| 7 | COPY CONTROL | COPY PROTECTED /ENABLED | 0 : PROTECTED | 1 : ENABLED |
| 6 | | GENERATION | 0 : ORIGINAL | 1 : 1ST OR HIGHER |
| 5 | HIGH-SPEED DIGITAL COPY CONTROL (HCMS) | | 00 : COPY PROTECTED | 01 : 1ST GENERATION |
| 4 | | | 10 : COPY ENABLED | |
| 3 | COPY ATTRIBUTE | | 000 : RESERVED | |
| | | | 001 : CONTENT RECORDED FROM ORIGINAL SOURCE | |
| 2 | | | 010 : CONTENT COPIED FROM LCM | |
| 1 | | | 011 : CONTENT MOVED FROM LCM | |
| | | | 100 OR HIGHER : RESERVED | |
| 0 | RESERVED | | | |

LCM : LICENSED COMPLIANT MODULE
EXAMPLE : HDD, ETC. OF PC AND CONSUMER EQUIPMENT

FILE SYSTEM
PROCESSING HIERARCHY

FIG. 11
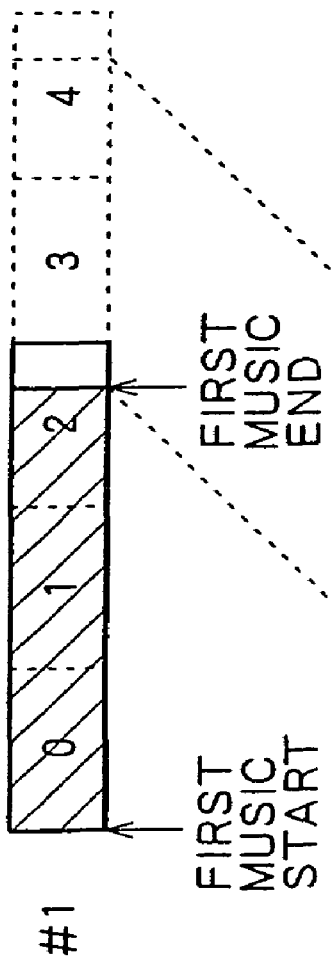
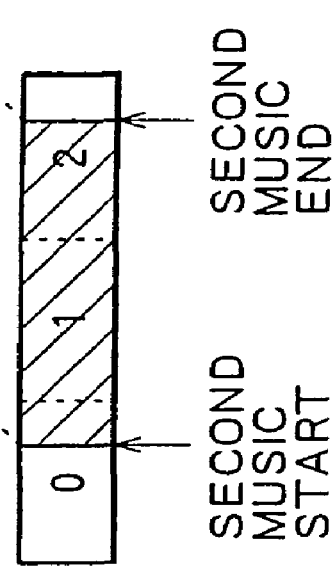

FIG. 12

REPRODUCTION MANAGEMENT FILE (PBLIST)

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| HEADER 0x0000 | BLKID-TL0 | | | | Reserved | | MCode | | REVISION | | | | Reserved | | | |
| 0x0010 | SN1C+L | | SN2C-L | | SINFSIZE | | T-TRK | | VerNo | | Reserved | | | | | |
| 0x0020 | NM1-S (256) | | | | | | | | | | | | | | | |
| 0x0120 | NM2-S (512) | | | | | | | | | | | | | | | |
| 0x0320 | Reserved | | | | | | | | CONTENTS KEY | | | | | | | |
| 0x0330 | Reserved | | | | | | | | MAC | | | | | | | |
| | Reserved | | | | | | | | | | | | | | S-YMDhms | |
| TRKTBL 0x0350 | TRK-001 | | TRK-002 | | TRK-003 | | TRK-004 | | TRK-005 | | TRK-006 | | TRK-007 | | TRK-008 | |
| | TRK-009 | | TRK-010 | | TRK-011 | | TRK-012 | | TRK-013 | | TRK-014 | | TRK-015 | | TRK-016 | |
| | ... | | | | | | | | | | | | | | | |
| 0x0660 | TRK-393 | | TRK-394 | | TRK-395 | | TRK-396 | | TRK-397 | | TRK-398 | | TRK-399 | | TRK-400 | |
| 0x0647 | INF-S (14720) | | | | | | | | | | | | | | | |
| 0x3FF0 | BLKID-TL0 | | | | Reserved | | MCode | | REVISION | | | | Reserved | | | |

FIG. 13

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| INF | 0x00 | ID | 0x00 | SIZE | | MCode | | C+L | | Reserved | | DATA VARIABLE LENGTH | | | |

ADDITIONAL INFORMATION DATA (INF-S)

FIG. 14

ADDITIONAL INFORMATION KEY CODES

| ID | MUSIC (CHARACTER) | | ID | URL (WEB) | |
|---|---|---|---|---|---|
| 0 | RESERVED | | 32 | RESERVED | |
| 1 | ALBUM | VARIABLE | 33 | ALBUM | VARIABLE |
| 2 | SUBTITLE | VARIABLE | 34 | SUBTITLE | VARIABLE |
| 3 | ARTIST | VARIABLE | 35 | ARTIST | VARIABLE |
| 4 | CONDUCTOR | VARIABLE | 36 | CONDUCTOR | VARIABLE |
| 5 | ORCHESTRA | VARIABLE | 37 | ORCHESTRA | VARIABLE |
| 6 | PRODUCER | VARIABLE | 38 | PRODUCER | VARIABLE |
| 7 | PUBLICATION/PUBLISHER | VARIABLE | 39 | PUBLICATION/PUBLISHER | VARIABLE |
| 8 | COMPOSER | VARIABLE | 40 | COMPOSER | VARIABLE |
| 9 | SONG WRITER | VARIABLE | 41 | SONG WRITER | VARIABLE |
| 10 | ADAPTER | VARIABLE | 42 | ADAPTER | VARIABLE |
| 11 | SPONSOR | VARIABLE | 43 | SPONSOR | VARIABLE |
| 12 | CM | VARIABLE | 44 | CM | VARIABLE |
| 13 | DESCRIPTION | VARIABLE | 45 | DESCRIPTION | VARIABLE |
| 14 | ORIGINAL TITLE NAME | VARIABLE | 46 | ORIGINAL TITLE NAME | VARIABLE |
| 15 | ORIGINAL ALBUM NAME | VARIABLE | 47 | ORIGINAL ALBUM NAME | VARIABLE |
| 16 | ORIGINAL COMPOSER | VARIABLE | 48 | ORIGINAL COMPOSER | VARIABLE |
| 17 | ORIGINAL SONG WRITER | VARIABLE | 49 | ORIGINAL SONG WRITER | VARIABLE |
| 18 | ORIGINAL ADAPTER | VARIABLE | 50 | ORIGINAL ADAPTER | VARIABLE |
| 19 | ORIGINAL PLAYER | VARIABLE | 51 | ORIGINAL PLAYER | VARIABLE |
| 20 | MESSAGE | VARIABLE | 52 | | |
| 21 | COMMENT | VARIABLE | 53 | | |
| 22 | WARNING | VARIABLE | 54 | | |
| 23 | GENRE | VARIABLE | 55 | | |
| 24 | TEXT | VARIABLE | 56 | | |
| 25 | | | 57 | | |
| 26 | | | 58 | | |
| 27 | | | 59 | | |
| 28 | | | 60 | | |
| 29 | | | 61 | | |
| 30 | | | 62 | | |
| 31 | | | 63 | | |

FIG. 15

ADDITIONAL INFORMATION KEY CODES

| ID | PATH/OTHERS | | ID | CONTROL/NUMERIC DATA | |
|---|---|---|---|---|---|
| 64 | RESERVED | | 96 | RESERVED | |
| 65 | PATH TO IMAGE DATA | VARIABLE | 97 | ISRC | 8 |
| 66 | PATH TO LYRICS DATA | VARIABLE | 98 | TOC-ID | 8 |
| 67 | PATH TO MIDI DATA | VARIABLE | 99 | UPC/JAN | 7 |
| 68 | PATH TO DESCRIPTION DATA | VARIABLE | 100 | RECORDING DATE (YMDhms) | 4 |
| 69 | PATH TO COMMENT DATA | VARIABLE | 101 | RELEASE DATE (YMDhms) | 4 |
| 70 | PATH TO CM DATA | VARIABLE | 102 | ORIGINAL RELEASE DATE (YMDhms) | 4 |
| 71 | PATH TO FAX DATA | VARIABLE | 103 | RECORDING DATE (YMDhms) | 4 |
| 72 | PATH TO COMMUNICATION DATA 1 | VARIABLE | 104 | SUB TRACK | 4 |
| 73 | PATH TO COMMUNICATION DATA 2 | VARIABLE | 105 | AVERAGE VOLUME | 1 |
| 74 | PATH TO CONTROL DATA | VARIABLE | 106 | RESUME | 4 |
| 75 | | | 107 | REPRODUCTION LOG (YMDhms) | 4 |
| 76 | | | 108 | REPRODUCTION COUNT (FOR LEARNING) | 1 |
| 77 | | | 109 | PASSWORD 1 | 16 |
| 78 | | | 110 | APP LEVEL | 16 |
| 79 | | | 111 | GENRE CODE | 2 |
| 80 | | | 112 | MIDI DATA | VARIABLE |
| 81 | PART ADDITIONAL INFORMATION | VARIABLE | 113 | THUMBNAIL PHOTO DATA | VARIABLE |
| 82 | | | 114 | CHARACTER BROADCAST DATA | VARIABLE |
| 83 | | | 115 | TOTAL NUMBER OF MUSIC | 2 |
| 84 | | | 116 | SET NUMBER | 1 |
| 85 | | | 117 | TOTAL NUMBER OF SET NUMBERS | 1 |
| 86 | | | 118 | REC POSITION INFORMATION-GPS | VARIABLE |
| 87 | | | 119 | PB POSITION INFORMATION-GPS | VARIABLE |
| 88 | | | 120 | REC POSITION INFORMATION-PHS | VARIABLE |
| 89 | | | 121 | PB POSITION INFORMATION-PHS | VARIABLE |
| 90 | DISC-TOC | VARIABLE | 122 | DESTINATION TELEPHONE NUMBER 1 | VARIABLE |
| 91 | | | 123 | DESTINATION TELEPHONE NUMBER 2 | VARIABLE |
| 92 | | | 124 | INPUT VALUE | VARIABLE |
| 93 | | | 125 | OUTPUT VALUE | VARIABLE |
| 94 | | | 126 | PB CONTROL DATA | VARIABLE |
| 95 | | | 127 | REC CONTROL DATA | VARIABLE |

FIG. 16

ADDITIONAL INFORMATION KEY CODES

| ID | SYNC REPRODUCTION | |
|---|---|---|
| 128 | RESERVED | |
| 129 | SYNC REPRODUCTION 1 | VARIABLE |
| 130 | SYNC REPRODUCTION 2 | VARIABLE |
| 131 | SYNC REPRODUCTION 3 | VARIABLE |
| 132 | SYNC REPRODUCTION 4 | VARIABLE |
| 133 | SYNC REPRODUCTION 5 | VARIABLE |
| 134 | SYNC REPRODUCTION 6 | VARIABLE |
| 135 | | |
| 136 | | |
| 137 | | |
| 138 | EMD 1 | VARIABLE |
| 139 | EMD 2 | VARIABLE |
| 140 | | |
| 141 | | |
| 142 | | |
| 143 | | |
| 144 | | |
| 145 | | |
| 146 | | |
| 147 | | |
| 148 | | |
| 149 | | |
| 150 | | |
| 151 | | |
| 152 | | |
| 153 | | |
| 154 | | |
| 155 | | |
| 156 | | |
| 157 | | |
| 158 | | |
| 159 | | |

FIG. 17A

| 0 | 1 | 2 | 3 | 4 | 5 | 6 | 7 | 8 | 9 | A | B | C | D | E | F |
|---|---|---|---|---|---|---|---|---|---|---|---|---|---|---|---|
| INF | 0x00 | ID | 0x00 | SIZE | | MCode | | C+L | | Reserved | | VARIABLE DATA | | | |

FIG. 17B

| ID | | ARTIST | | SIZE | | ASCII | ENGLISH | | | | DATA | | | |
|---|---|---|---|---|---|---|---|---|---|---|---|---|---|---|
| 0x69 | 0x00 | 3 | 0x00 | 0x1C(28) | | MCode | 0x01 | 0x09 | 0x00 | 0x00 | S | I | M | O |
| N | & | A | B | C | D | E | F | G | H | I | 0x00 | | | |

FIG. 17C

| | | | | | | ID | | ISRC | |
|---|---|---|---|---|---|---|---|---|---|
| | | | | | | 0x69 | 0x00 | 97 | 0x00 |
| SIZE | | BINARY NO SETTING | | | | | | | |
| 0x14(20) | MCode | 0x00 | 0x00 | 0x00 | 0x00 | ISRC Code 8Bytes DATA | | | |

FIG. 17D

| ID | | RECORDING DATE | | SIZE | | BINARY NO SETTING | | | | | DATA | |
|---|---|---|---|---|---|---|---|---|---|---|---|---|
| 0x69 | 0x00 | 103 | 0x00 | 0x10(16) | | MCode | 0x00 | 0x00 | 0x00 | 0x00 | YMD | hms |

745  565

| Y | M | D | h | m | s |
|---|---|---|---|---|---|

31,30,29 ... 3,2,1,0bit

FIG. 17E

| ID | | REPRO- DUCTION LOG | | SIZE | | BINARY NO SETTING | | | | | DATA | |
|---|---|---|---|---|---|---|---|---|---|---|---|---|
| 0x69 | 0x00 | 103 | 0x00 | 0x10(15) | | MCode | 0x00 | 0x00 | 0x00 | 0x00 | YMD | hms |

745  565

| Y | M | D | h | m | s |
|---|---|---|---|---|---|

31,30,29 ... 3,2,1,0bit

FIG. 18

A3Dnnnn.MSA (ATRAC3 DATA FILE)

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 0x0000 | \multicolumn{4}{BLKID-HD0} | | | Reserved | MCode | | Reserved | | | | BLOCK SERIAL | | | | HEADER |
| 0x0010 | N1C+L | | N2C+L | | INFSIZE | | T-PRT | | T-SU | | | | INX | | XT | | |
| 0x0020 | NM1 (256) |||||||||||||||| |
| 0x0120 | NM2 (512) |||||||||||||||| |
| 0x0310 | |||||||||||||||| |
| 0x0320 | Reserved (8) |||||||| CONTENTS KEY |||||||| TRKINF |
| | Reserved (8) |||||||| C-MAC [n] |||||||| |
| | Reserved (12) |||||||||||| A | | LT | | FNo | | |
| | MG (D) SERIAL-nnn |||||||||||||||| |
| 0x0360 | CONNUM |||| YMDhms-S |||||| YMDhms-E |||| MT | CT | CC | CN | |
| 0x0370 | PRTSIZE |||| PRTKEY |||||||| Reserved (8) |||| PRTINF |
| 0x0380 | |||| CONNUMO |||| PRTSIZE(0x0388) |||| PRTKEY |||| |
| 0x0390 | |||| Reserved (8) |||||||| CONNUMO |||| |
| | INF (0x0400) |||||||||||||||| |
| 0x3FFF | BLKID-HD0 |||| Reserved | | MCode | | Reserved |||| BLOCK SERIAL |||| |
| 0x4000 | BLKID-A3D |||| Reserved | | MCode | | CONNUMO |||| BLOCK SERIAL |||| HEADER |
| 0x4010 | BLOCK SEED |||||||| INITIALIZATION VECTOR |||||||| |
| 0x4020 | SU-000 (Nbytes=384bytes) |||||||||||||||| |
| 0x41A0 | SU-001 (Nbytes) |||||||||||||||| BLOCK |
| 0x4320 | SU-002 (Nbytes) |||||||||||||||| |
| 0x04A0 | SU-041 (Nbytes) |||||||||||||||| |
| 0x70A0 | |||||||||||||||| |
| 0x7F20 | Reserved (Nbytes=208bytes) |||||||||||||||| |
| | BLOCK SEED |||||||| | | | | | | | | |
| 0x7FF0 | BLKID-A3D |||| Reserved | | MCode | | CONNUMO |||| BLOCK SERIAL |||| |

BLOCK (ATTRIBUTE HEADER)

FIG. 19

| BIT | MEANING | VALUE | | | | |
|---|---|---|---|---|---|---|
| 7 | ATRAC3 MODE | 0 : DUAL | | | 1 : JOINT | |
| 6<br>5<br>4 | RATE VALUE | N<br>7<br>6<br>5<br>4<br>3<br>2<br>1<br>0 | DISPLAY<br>HQ<br>EX<br>EX<br>SP<br>LP<br>LP<br>MN<br>MN | TIME<br>47min<br>58min<br>64min<br>81min<br>90min<br>128min<br>181min<br>258min | RATE<br>176kbps<br>146kbps<br>132kbps<br>105kbps<br>94kbps<br>66kbps<br>47kbps<br>33kbps | SU<br>31SU<br>38SU<br>42SU<br>53SU<br>59SU<br>84SU<br>119SU<br>169SU | BYTE<br>512<br>424<br>384<br>304<br>272<br>192<br>136<br>96 |
| | | (N IS VALUE OF 3 BITS 6, 5, AND 4)<br>* N=0, 1 MONAURAL SPECIFIES SPECIAL JOINT<br>MODE OF ONLY MAIN SIGNAL WITH BIT 7 BEING<br>"1" (JOINT) | | | | | |
| 3 | RESERVED | | | | | |
| 2 | DATA DIVISION | 0 : AUDIO | | | 1 : OTHER | |
| 1 | REPRODUCTION SKIP | 0 : NORMAL REPRODUCTION | | | 1 : SKIP | |
| 0 | EMPHASIS | 0 : OFF | | | 1 : ON (50/15μs) | |

| BIT | | MEANING | VALUE |
|---|---|---|---|
| CC | 7 | COPY CONTROL — COPY PROTECTED/ENABLED | 0: PROTECTED    1: ENABLED |
| | 6 | GENERATION | 0: ORIGINAL    1: 1ST OR HIGHER |
| | 5 | HIGH-SPEED DIGITAL COPY CONTROL (HCMS) | 00: COPY PROTECTED    01: 1ST GENERATION |
| | 4 | | 10: COPY ENABLED |
| | 3 | COPY ATTRIBUTE | 000: RESERVED |
| | 2 | | 001: CONTENT RECORDED FROM ORIGINAL SOURCE |
| | 1 | | 010: CONTENT COPIED FROM LCM |
| | | | 011: CONTENT MOVED FROM LCM |
| | | | 100 OR HIGHER: RESERVED |
| | 0 | RESERVED | |

LCM: LICENSED COMPLIANT MODULE
EXAMPLE: HDD, ETC. OF PC AND CONSUMER EQUIPMENT

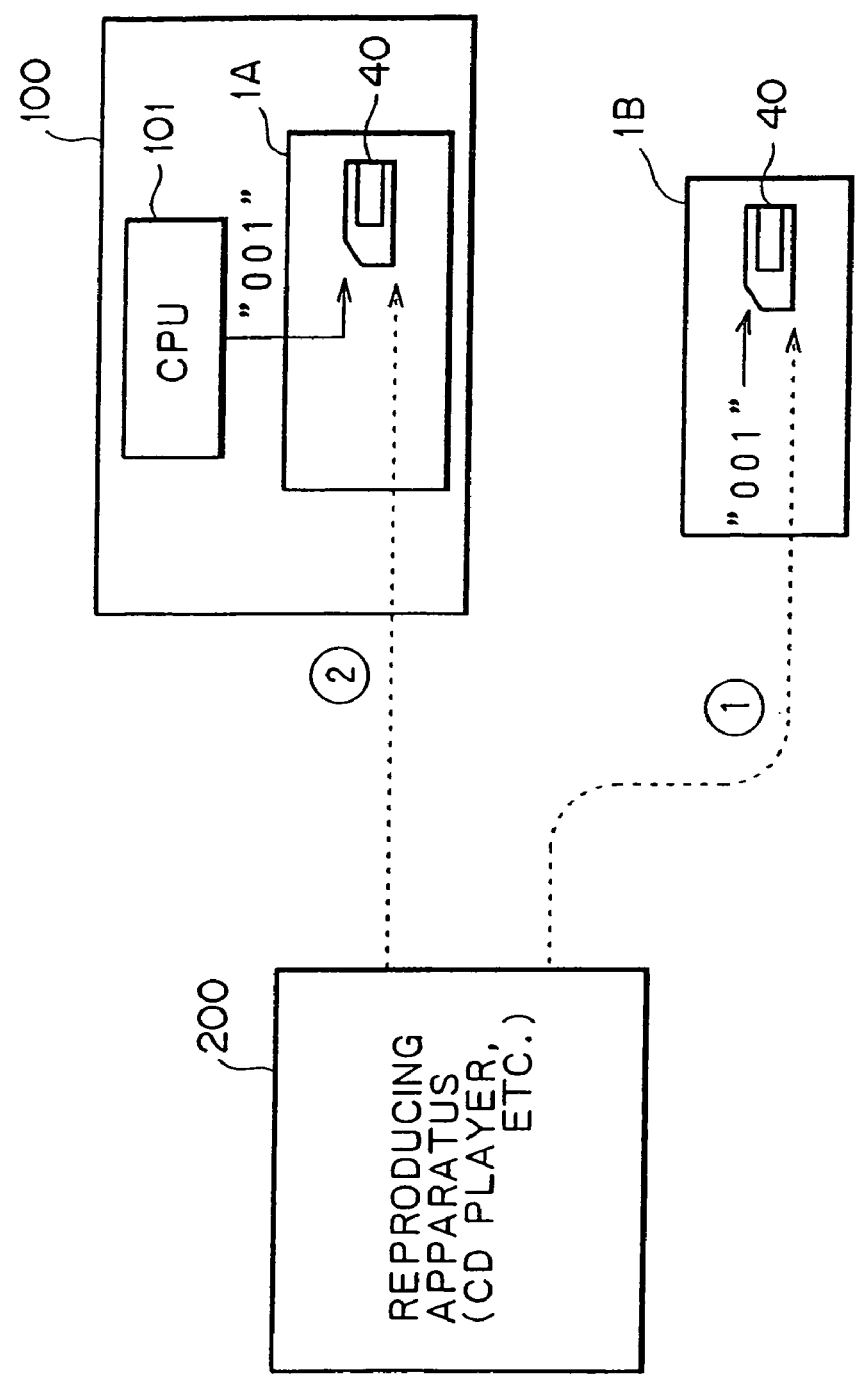

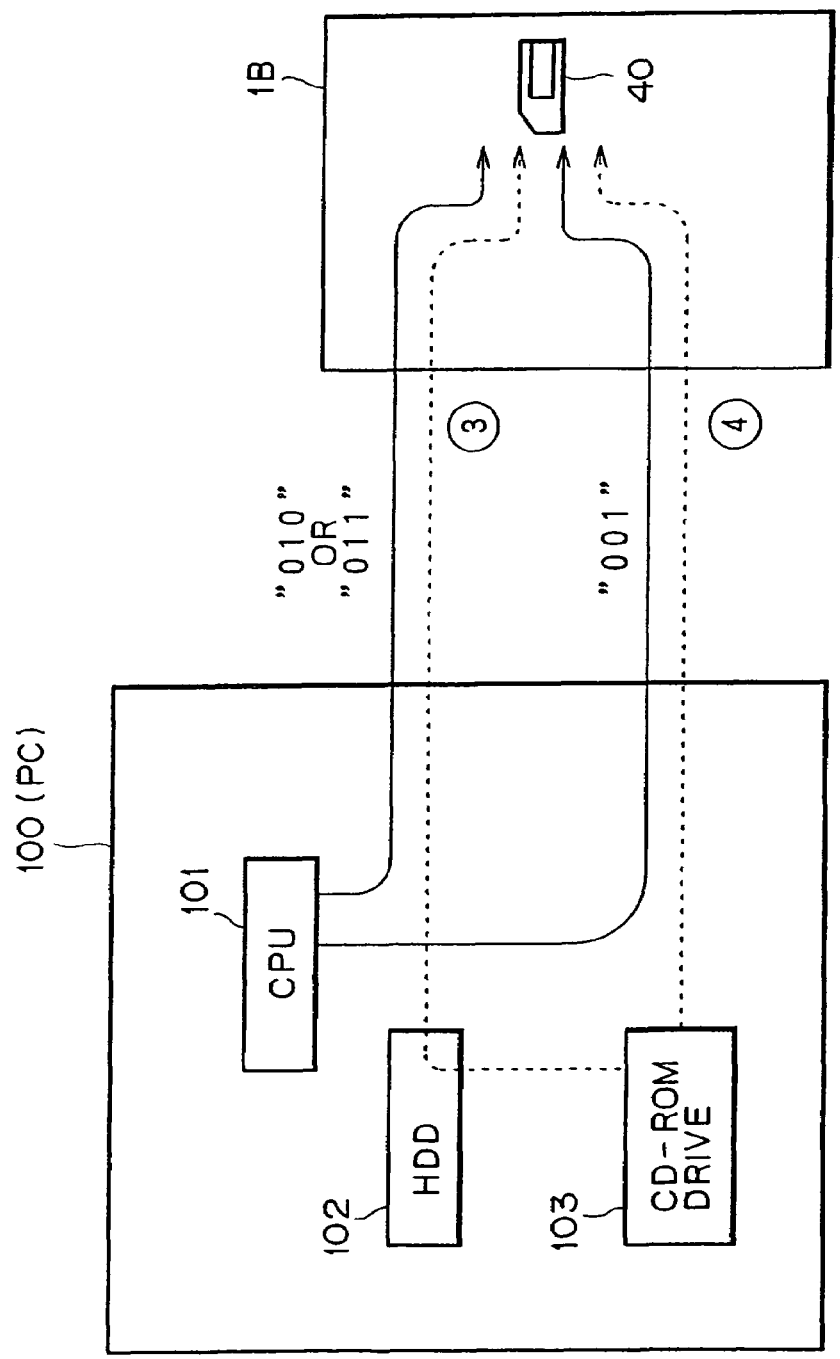

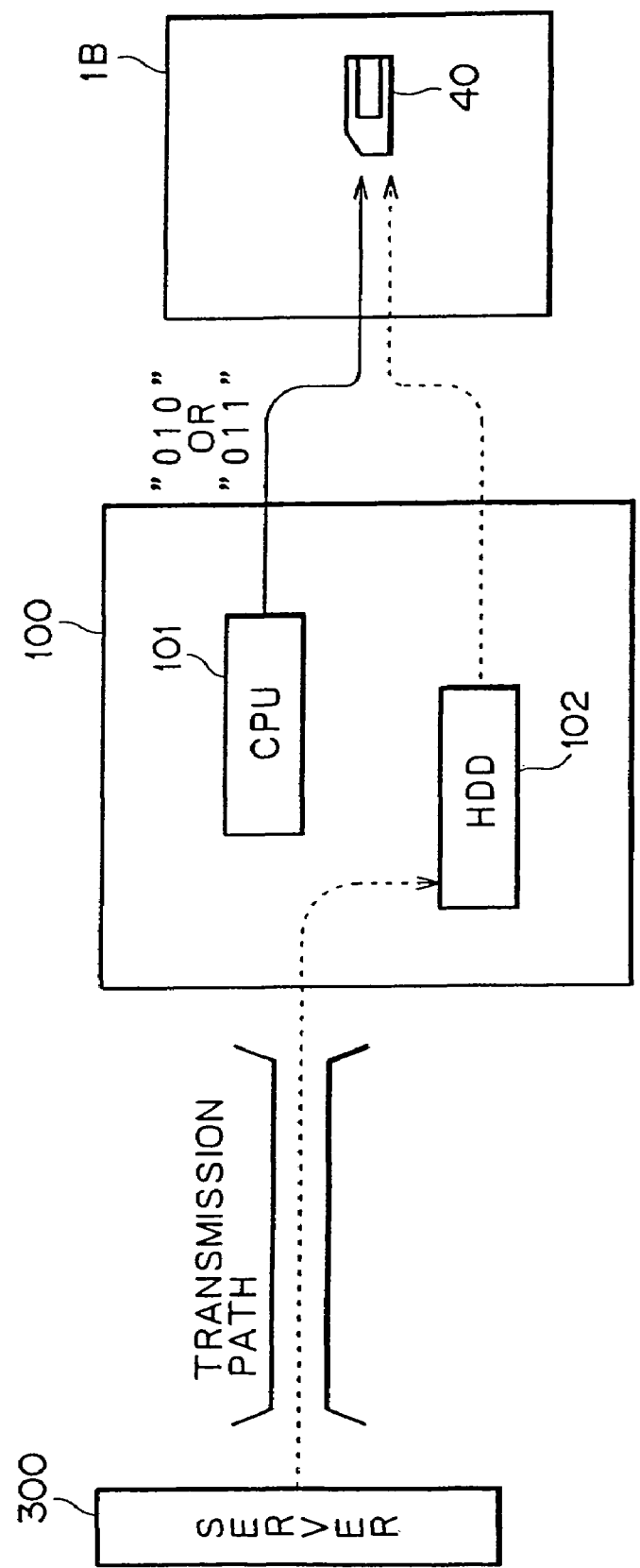

RECORDING MEDIUM EDITING APPARATUS BASED ON CONTENT SUPPLY SOURCE

This application is a continuation of U.S. application Ser. No. 09/692,913, filed Oct. 20, 2000 now U.S. Pat. No. 6,907,184.

BACKGROUND OF THE INVENTION

1. Field of the Invention

The present invention relates generally to a recording medium for recording content such as audio data and video data, an editing apparatus for editing recorded content, and a recording system for recording content to the recording medium.

2. Description of the Related Art

In an electrically erasable non-volatile memory—called an EEPROM (Electrically Erasable Programmable ROM)—one bit of data is stored by using two transistors. This two transistor configuration means that EEPROM circuits require a relatively large integrated circuit surface area which limits their integration density.

To solve this memory density limitation problem, a flash memory has been developed in which one bit is stored using only one transistor and wherein all bits can be erased simultaneously. The flash memory is expected to replace such recording media as magnetic discs and optical discs.

A removable flash memory card has been developed for use with various electronic devices. This memory card can be used in digital audio data recording/reproducing apparatuses instead of, or in addition to, conventional disc media such as CD (Compact Disc) and MD (Mini Disc).

Audio and video data recording systems that use flash memory card technology generally track recorded content using the FAT (File Allocation Table) file system. The FAT system is a file management system commonly used in personal computers for tracking and editing stored content. For example, assume a single musical composition is stored in flash memory as a single piece of audio data content. The FAT system then allows that piece to be edited either by dividing it into two or more pieces or by combining it with other pieces to form a single combined piece. Thus, the FAT system allows users to manipulate, as desired, content recorded on flash memory cards.

Recording systems using flash memory cards can transfer content to and from numerous sources using a variety of data transfer routes. For example, content can be copied or moved into the memory card from a recording medium like a CD, MD, or HDD (Hard Disc Drive) or be downloaded from a content service provider through a communication system such as the Internet. Likewise, content can be copied or moved into any of these systems from the memory card. Numerous other transfer routes to and from the memory card are possible. Note that "moving" content denotes transferring the data from one memory to another so that the content no longer exists at the source.

The problem posed by such systems is that regardless of the content supply source, content recorded on a memory card can be edited without restriction. This means content can be edited even when the content provider or the copyright holder of the content does not want their content to be edited. Thus, a means for disabling or restricting the ability to edit content is required.

OBJECTS OF THE INVENTION

It is therefore an object of the present invention to enable or disable editing of content recorded on a memory card or another recording media in accordance with the source of that content.

Other objects and advantages of the invention will in part be obvious and will in part be apparent from the specification and the drawings.

SUMMARY OF THE INVENTION

To attain the above-mentioned object, a recording medium according to the invention provides a content recording area for recording content supplied from a content supply source and a management area in which identification information for identifying the content supply source can be recorded. In other words, identification information indicating the content supply source is recorded on the recording medium along with the recorded content supplied from that content supply source. When a user attempts to edit the recorded content, the identification information is read and, according to the content supply source identified by the identification information, editing is either enabled or disabled. For example, if the identified content supply source is an internet server site, the ability to edit the content is disabled.

Another aspect of the invention is an editing apparatus capable of editing content recorded in the above-mentioned content recording area of the recording medium. The editing apparatus comprising operating means by which the user specifies the editing of content recorded in the content recording area, decision means for determining a content supply source by the identification information about the content for which edit processing has been specified by the operating means, and control means for enabling or disabling, according to the content supply source determined by the decision means, the content edit processing specified from the operating means.

A further aspect of the invention is a recording system according to the invention comprising content recording means for recording content supplied from a content supply source to the content recording area of the recording medium, identification information generating means for generating identification information for identifying the content supply source according to the content supply source, and identification information recording means for recording the identification information generated by the identification information generating means onto the managing area of the recording medium in correspondence with the content recorded in the content recording area.

BRIEF DESCRIPTION OF THE DRAWINGS

For a more complete understanding of the invention, reference is made to the following description and accompanying drawings, in which:

FIG. 11 is a diagram showing a divide edit process using the data files shown in FIGS. 9A–C;

FIG. 12 is a diagram showing the detailed configuration of the reproduction management file shown in FIG. 7;

FIG. 13 is a diagram showing the detailed configuration of the additional information area INF-S of the reproduction management file shown in FIG. 12;

FIG. 14 is a table showing additional information key codes used in the additional information area;

FIG. 15 is a table showing further additional information key codes used in the additional information area;

FIG. 16 is a table showing further additional information key codes used in the additional information area;

FIGS. 17A–E are diagrams showing specific data configurations of additional information for one embodiment of the invention;

FIG. 18 is a diagram showing the detailed configuration of a data file for one embodiment of the invention;

FIG. 19 is a diagram showing the details of location "A" in the attribute header of the data file shown in FIG. 18;

FIG. 20 is a diagram showing the details of location "CC" in the attribute header of the data file shown in FIG. 18;

FIG. 21 is a diagram illustrating an example of recording routes to a memory card;

FIG. 22 is a diagram illustrating another example of recording routes to a memory card;

FIG. 23 is a diagram illustrating still another example of recording routes to a memory card;

DETAILED DESCRIPTION OF PREFERRED EMBODIMENTS

Figure 1:
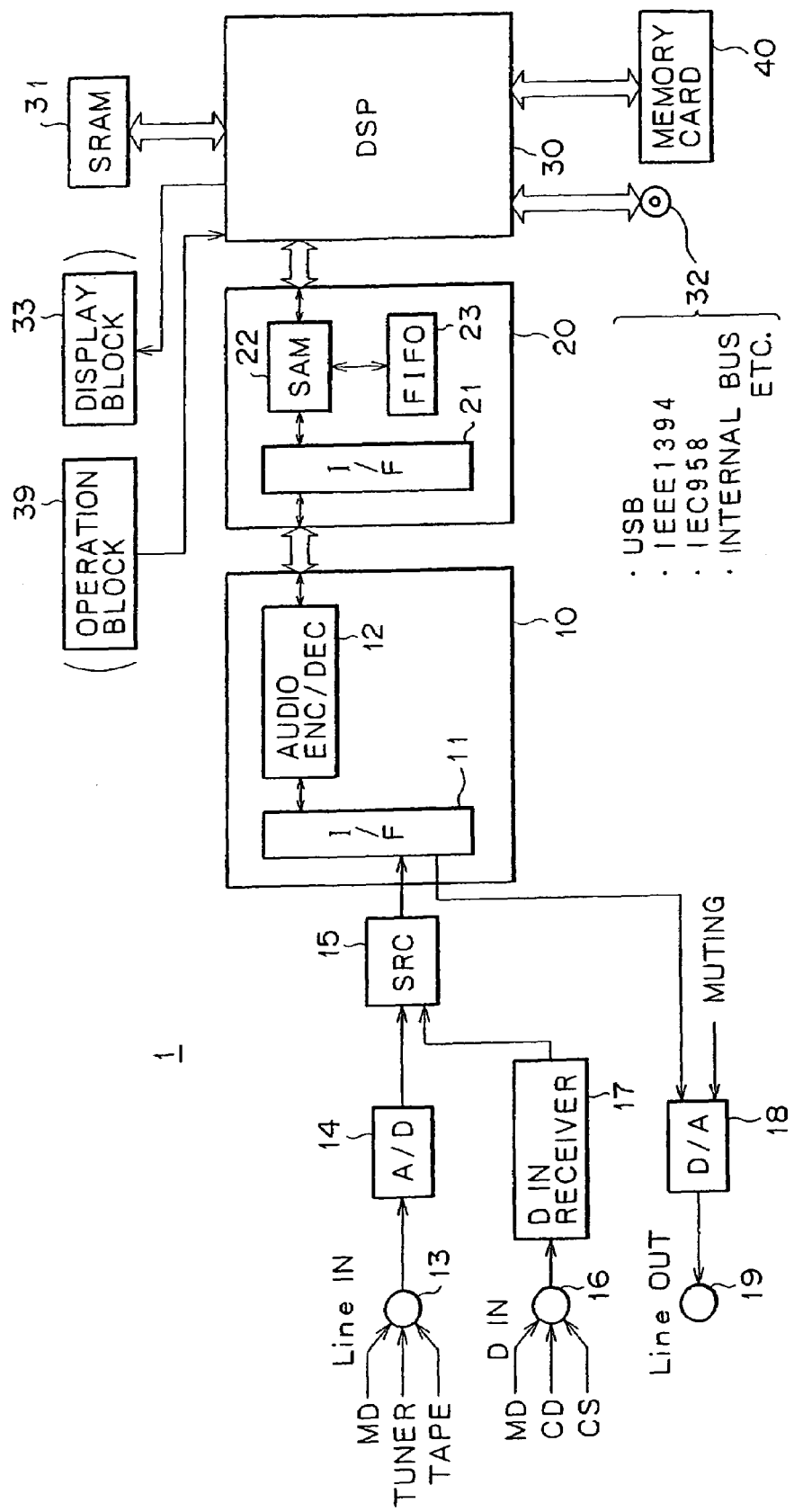
FIG. 1 is a block diagram showing a recorder practiced as one embodiment of the invention.

The preferred embodiments of the editing apparatus and recording system according to the present invention will be described with reference to the accompanying drawings. The embodiments use a memory card based on non-volatile memory (or flash memory) as the recording medium. As an example of an editing apparatus, a recorder or a system based on a recorder and a personal computer capable of recording/reproducing data on the above-mentioned memory card is used. The content data which can be handled by the following embodiments includes digital audio, video, still pictures, text, and software programs. For purposes of this description, audio (i.e., music) is used as the content data. It should be noted that even when audio is being used, the invention can also record/reproduce images and characters as additional data. The embodiments will be described in the following order:

1. Configuration of the Recorder
2. Configuration of the Memory Card
3. File System
   3-1. Processing structure and data structure
   3-2. Directory structure
   3-3. Management structure and editing scheme
   3-4. Reproduction management file
   3-5. Data files
4. Content Source Identification Information
5. Enabling and Disabling Editing 1. Configuration of the Recorder FIG. 1 shows the configuration of a memory card recording/reproducing apparatus (hereinafter referred to as recorder 1) capable of recording and reproducing content, such as audio data, on a memory card. Recorder 1 uses a detachable memory card as its recording medium. Recorder 1 may be configured as a stand-alone audio device or incorporated into a personal computer or an audio/visual device. As a stand-alone device, the recorder could be a full-size rack component or a portable unit. Further, the recorder may be integrated into an audio system along with other components such as an amplifier, a speaker, a CD player, a MD recorder, a tuner, etc. . . . When integrated the recorder may be configured as a memory card drive occupying a position similar to CD-ROM drives and floppy disc drives in personal computers. The recorder may also be incorporated into a video camera or game machine using the memory card as a recording medium for video data and audio data. Regardless of the configuration, the recorder can be used for recording digital audio signals distributed through satellite-based systems, digital broadcasting, or the Internet. FIG. 1 shows a generic configuration of recorder 1 as a memory card recording/reproducing apparatus that can be realized in any of the above-mentioned applications.

Recorder 1 has an audio encoder/decoder IC 10, a security IC 20, and a DSP (Digital Signal Processor) 30, each implemented using a single IC chip. A memory card 40 is detachably mounted on the recorder. The memory card is formed by a flash memory (a nonvolatile memory), a memory control block, and a security block including a DES (Data Encryption Standard) encryption circuit, all implemented in one IC chip. From the foregoing discussion, it will be apparent that a microcomputer or equivalent may be used instead of DSP 30.

The audio encoder/decoder IC has an audio interface 11 and an encoder/decoder block 12. The encoder/decoder block efficiently encodes a digital signal so that it is written to memory card 40 and decodes data read from memory. For high efficiency encoding improved ATRAC (Adaptive Transform Acoustic Coding referred to as ATRAC3), as used for the Mini Disc, is used. In ATRAC3, 16 bit wide audio data sampled at 44.1 KHz is processed. The minimum audio data unit processed by ATRAC3 is a sound unit SU. A SU is 1,024 samples of data (1,024×16 bits×2 channels) compressed into several hundred bytes, covering about 23 ms of playing time. Audio data is compressed by ATRAC3 into about 1/10 of the original data size. The signal processing of ATRAC3 minimizes the deterioration of tone quality due to refinements in the compression and decompression processing.

A line input selector 13 selectively supplies MD reproduction output, a tuner output, or a tape reproduction output to an A/D converter 14. The A/D converter 14 converts a selected line input signal into a digital audio signal (sampling frequency=44.1 KHz, 1 sample=16 bits).

A digital input selector 16 selectively supplies MD, CD, or CS (satellite digital broadcast) to a digital input receiver 17. Digital inputs are typically transmitted through an optical cable. The output of the digital input receiver is supplied to a sampling rate converter 15, in which the sampling frequency of the digital input is converted to 44.1 KHz.

The encoded data obtained by the encoding in encoder/decoder block 12 of the audio encoder/decoder IC 10 is supplied to DES encryption circuit 22 through interface 21 of security IC 20. The DES encryption circuit has a FIFO 23. The DES encryption circuit is provided to protect copyrights of the content. Memory card 40 also incorporates a DES encryption circuit, which will be described later. DES encryption circuit 22 of recorder 1 has two or more master keys and a device-unique storage key. In addition, the DES encryption circuit has a random number generator to share authentication and session keys with the memory card. The DES encryption circuit can turn a key on by using the storage key.

The encrypted audio data from the DES encryption circuit is supplied to DSP (Digital Signal Processor) 30. DSP 30 communicates with memory card 40 through an attached adapting mechanism (not shown), and writes the encrypted data to the flash memory. Serial communication is carried out between the DSP and the memory card. In order to allocate a memory size large enough to control the memory card, an external SRAM (Static Random Access Memory) 31 is connected to the DSP.

The DSP is also connected to a terminal 32 through which content data and control data are transferred with external devices or external circuit blocks (not shown). The DSP communicates with external devices through interface 37, shown in FIG. 2. Interface 37 and terminal 32 are compliant with any of the numerous communication standards; such as USB, IEEE 1394, IEC 958, serial port, and parallel port. This allows the recorder to communicate with personal computers and audio/visual equipment. If recorder 1 is incorporated in a personal computer or an audio/visual device, interface 37 and terminal 32 are configured as an internal bus connected to the system controller in the personal computer or the audio/visual device.

From the device or block connected to terminal 32, various data is supplied to DSP 30. For example, if the recorder is part of an audio system or a computer system, an external system controller for controlling the entire operation of the audio system or the computer system provides record and playback commands generated according to user operations. Additional information data, such as image information and text information, are also supplied to the DSP through the terminal.

In addition, DSP 30 can supply additional information data and control signals read from memory card 40 to the system controller.

FIG. 1 also shows an operation block 39 having various controls with which a user carries out desired operations and a display block 33 on which various pieces of information are displayed to the user. These blocks are required when the recorder is configured as a stand-alone unit. If the recorder is incorporated in a personal computer, operation block 39 and display block 33 need not be directly connected to the DSP. Namely, in the stand-alone configuration, the DSP processes inputs from the operation block and controls the display block. In the incorporated configuration, the system controller of the host device executes these control operations, supplying operational information to the DSP and receiving information indicative of the contents to be displayed from the DSP, as required.

The encrypted audio data, as content read by DSP 30 from memory card 40, is decrypted by security IC 20 and the decrypted audio data is then ATRAC3-decoded by audio encoder/decoder IC 10. The decoded output of the audio encoder/decoder IC is supplied to D/A converter 18 to be converted into an analog audio signal. The analog audio signal is output to a line output terminal 19. The line output is transmitted to an amplifier (not shown), to be reproduced through a speaker or headphone.

It should be noted that a muting signal can be supplied from an external controller to the D/A converter. If the muting signal indicates that muting is on, the audio output from line output terminal 19 is suppressed. FIG. 1 shows line output terminal 19. It will be apparent that a digital output terminal, a headphone terminal, etc. may also be used. The content data may also be output to an external device through terminal 32, as described above.

Figure 2:
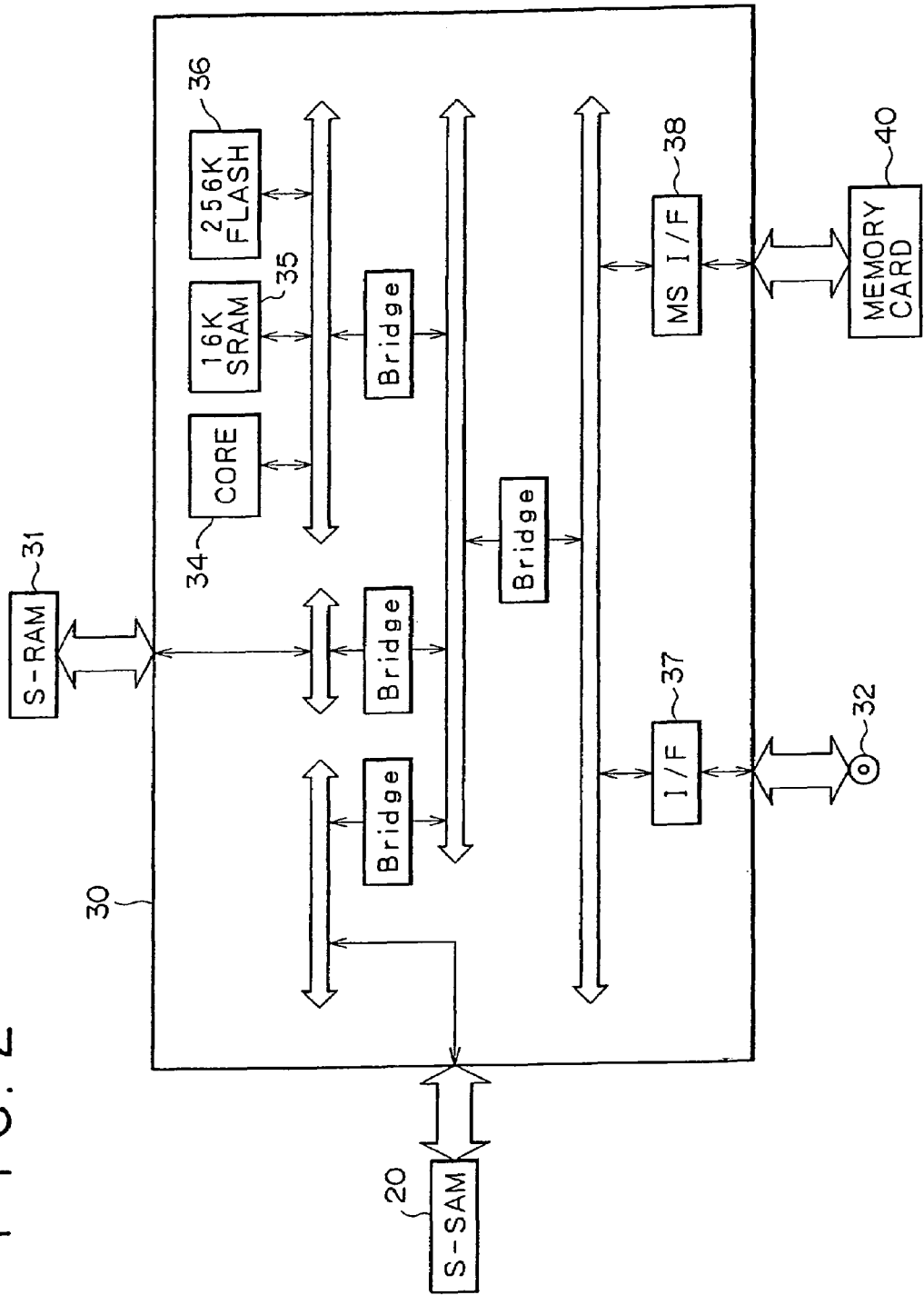
FIG. 2 is a block diagram showing the DSP of the recorder shown in the embodiment of FIG. 1.

FIG. 2 shows an internal configuration of DSP 30. DSP 30 is made up of a core 34, a flash memory 35, an SRAM 36, an interface 37, a memory card interface 38, buses, and inter-bus bridges. The DSP functions like a microcomputer, core 34 being equivalent to a CPU. The flash memory stores programs necessary for DSP processing. SRAM 36 and SRAM 31 are used as working memories necessary for various processing operations.

DSP 30 responds to an operation signal, such as a record command received through interface 37 or input from operation block 39, to write predetermined encrypted audio data and predetermined additional information data to memory card 40 and control processing of this data. More specifically, DSP 30 interprets application software for recording/reproducing audio data to control the memory card.

File management on the memory card is performed using the FAT file system, generally used on personal computers. In addition to this file system, the present embodiment also uses a reproduction management file. The reproduction management file manages the data files recorded on the memory card. The reproduction management file acts as a first file manager handling all audio data files. The FAT acts as a second file manager handling all files stored in the flash memory, including audio data files and the reproduction management file. The reproduction management file is recorded on the memory card. The FAT is written on the flash memory before shipment from the factory, along with a root directory.

In order to protect copyrights, the present embodiment encrypts the ATRAC3 compressed audio data. However, the management files are not encrypted because they are not considered to be copyrighted. Moreover, only some versions of memory card 40 have encryption capabilities. Recorders that record copyrighted audio data can only use those memory cards having encryption capabilities, as in the present embodiment.

2. Configuration of the Memory Card

Figure 3:
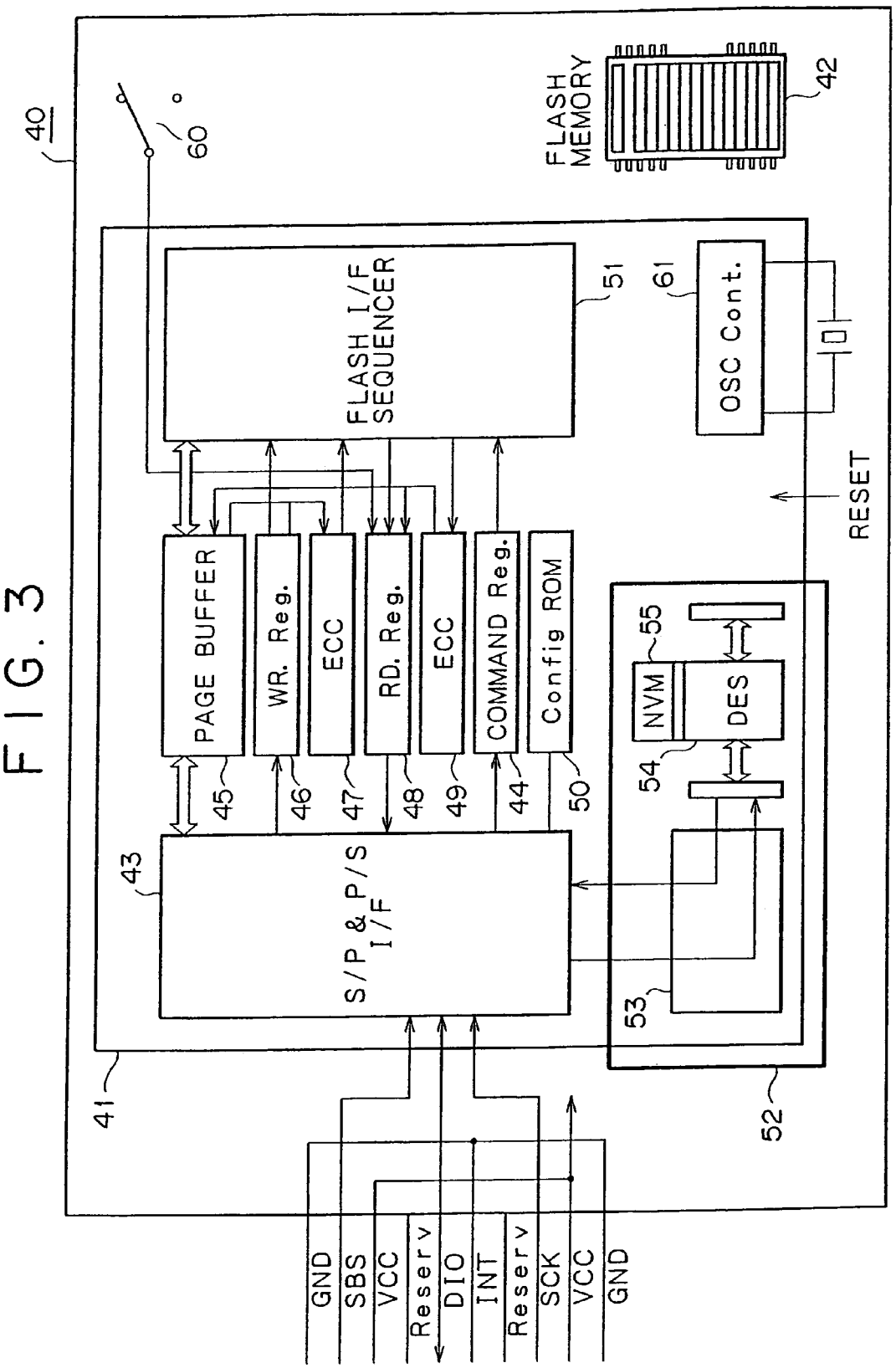
FIG. 3 is a block diagram showing the configuration of the memory card shown in the embodiment of FIG. 1.

FIG. 3 shows the configuration of memory card 40. The memory card is made up of control block 41 and flash memory 42 on one IC chip.

The two-way serial interface between DSP 30 and the memory card is composed of 10 lines. The four main lines are a clock line SCK for transmitting a clock signal, a status line SBS, data line DIO for transmitting data, and interrupt line INT. In addition, two ground lines GND and two supply lines VCC are arranged to supply power. Two reserved lines are undefined.

The clock line SCK transmits a clock signal synchronized with the data. The status line SBS transmits a signal indicative of the status of the memory card. The data line DIO inputs and outputs commands and encrypted audio data. The interrupt line INT transmits an interrupt signal to DSP 30 in response to an interrupt request by the memory card. An interrupt signal is also generated when the memory card is loaded in the recorder. However, in the present embodiment the interrupt line INT is grounded so the interrupt signal is transmitted over data line DIO.

A serial/parallel conversion and parallel/serial conversion interface block (S/P & P/S IF block) 43 acts as an interface between the DSP and the control block 41, that are interconnected through the above-mentioned lines. The S/P & P/S IF block converts serial data received from the DSP into parallel data and supplies it to the control block. It also converts parallel data from the control block into serial data and supplies it to the DSP. In addition, the S/P & P/S IF block receives commands and data through data line DIO and separates the received commands and data into those for normal access and those for encryption.

More specifically, in the format used by the data line, commands are transmitted first, followed by the data. The S/P & P/S IF block checks the command code to determine whether the transmitted command and data are for normal access or for encryption. According to this code, the normal access command is held in command register 44 and normal access data is held in page buffer 45 and write register 46. An error correction encoding circuit 47 is associated with the write register. For data temporarily stored in the page buffer, the error correction encoding circuit generates an error correction code.

The data output from the command register, the page buffer, the write register, and the error correction encoding circuit are supplied to a flash memory interface and sequencer (a memory IF sequencer) 51. The memory IF sequencer acts as a data transfer interface between the control block and the flash memory. Through the memory IF sequencer, data is written to the flash memory.

For copyright protection purposes, content (the audio data compressed by ATRAC3, hereafter being referred to as ATRAC3 data) to be written to the flash memory is encrypted by security IC 20 and security block 52 of the memory card. The security block has a buffer memory 53, a DES encryption circuit 54, and a nonvolatile memory 55. The security block has plural authentication keys and a storage key unique to each memory card. The nonvolatile memory stores the keys necessary for encryption and is not accessible from the outside. The storage key is stored in the nonvolatile memory.

In addition, security block 52 has a random number generator, allowing it to perform authentication with another recorder and to share session keys. For example, authentication is carried out when the memory card is first loaded into the recorder. This authentication is executed by the security IC and the security block of the memory card. When the recorder recognizes the loaded memory card and the memory card recognizes the recorder, cross authentication is established. When authentication is successfully made, the recorder and the memory card each generate a session key. Session keys are generated every time authentication is performed.

When content is written to the memory card, the recorder encrypts the content key using the session key and passes the encrypted content key to the memory card. The memory card then decrypts the received content key, re-encrypts it by the storage key, and passes the re-encrypted content key to the recorder. The storage key is unique to each memory card. Receiving the re-encrypted content key, the recorder executes format processing to write the re-encrypted content key and the encrypted content to the memory card.

When reading data from flash memory 42, the read data is supplied to page buffer 45, read register 48, and error correction circuit 49 through memory IF sequencer 51. The data held in the page buffer is corrected by the error correction circuit. The error-corrected output from the page buffer and the output of the read register are supplied to S/P & P/S IF block 43 and then to DSP 30 through the aforementioned serial interface.

When data is to be read, the content key encrypted by the storage key and the content encrypted by a block key are read from the flash memory. Then, the content key is decrypted by the security block by use of the storage key. The decrypted content key is encrypted by the session key to be sent to the recorder. The recorder decrypts the content key using the received session key. The recorder then generates a block key using the decrypted content key. By means of this block key, the encrypted ATRAC3 data is sequentially decrypted.

It should be noted that a configuration ROM 50 stores the version information of the memory card and various attribute information.

The memory card also has a switch 60 which can be operated by the user to protect the memory from erroneous deletion. When the switch is in the deletion disabled position, the flash memory cannot be deleted even if a deletion command comes from the recorder.

An oscillator 61 generates a clock signal to act as a timing reference for processing by the memory card.

3. File System 3-1. Processing Structure and Data Structure

Figure 4:
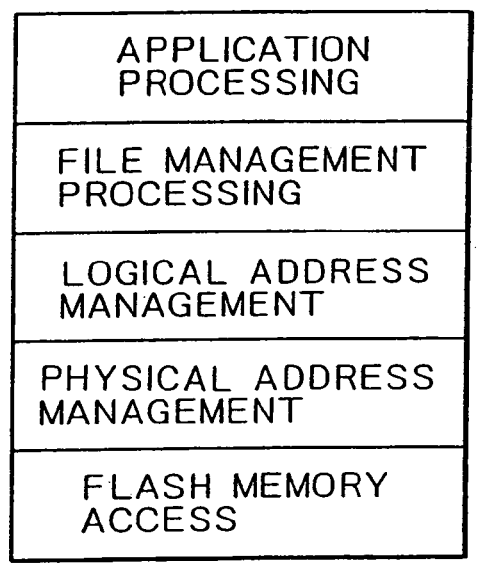
FIG. 4 is a diagram showing the configuration of a file system processing hierarchy used by the memory card shown in FIG. 3.

FIG. 4 shows a file system processing hierarchy for a recording medium using memory card 40. From the top is an application processing layer, followed by a file management processing layer, a logical address management layer, a physical address management layer, and a flash memory access layer. Within this hierarchical structure, the file management processing layer is a FAT file system. A physical address is given to each block of the flash memory. The relation between a block and its physical address is fixed. Further, logical addresses can be assigned to various blocks and are handled by the file management processing layer.

Figure 5:
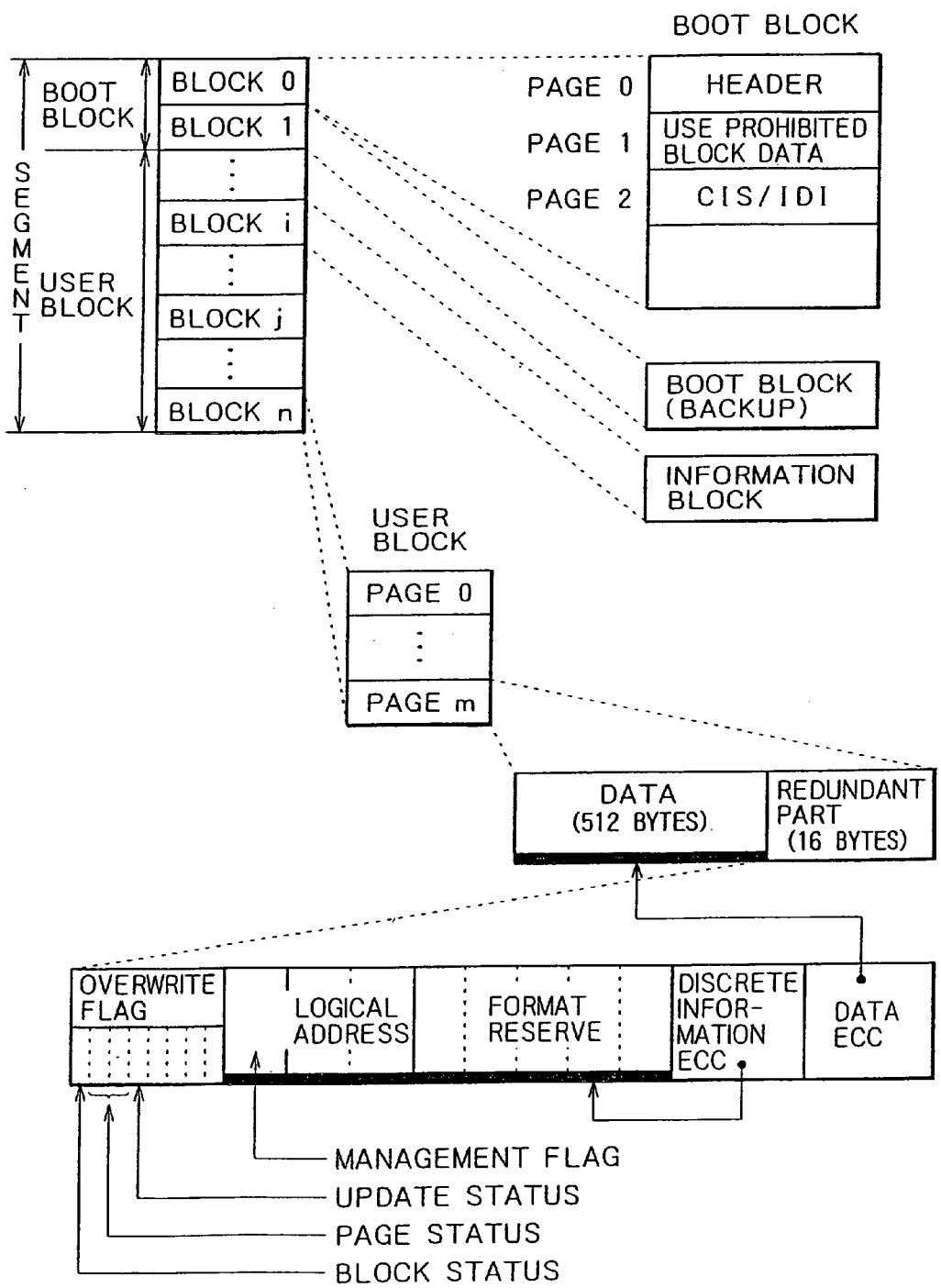
FIG. 5 is a diagram showing the data format used in the memory card shown in FIG. 3.

FIG. 5 shows an example of the physical configuration of data in flash memory 42 of memory card 40. In the flash memory the data is comprised of segments that are divided into a predetermined number of fixed length blocks, each block being further divided into a predetermined number of fixed length pages. In the flash memory, data is deleted on a block basis and read or written on a page basis.

One block is comprised of pages 0 through m. A block is 8 or 16 KB wide. One page is 512 bytes wide. Thus, the entire flash memory can be anywhere from 4 MB (512 blocks) to 64 MB (4,096 blocks) in size.

Each page is composed of a 512-byte data part and a 16-byte redundant part. The first three bytes of the redundant part form a 3-byte overwrite part where block status, page status, and update status are written. The remaining 13 bytes of the redundant part are fixed according to the contents of the data part. These 13 bytes include a management flag (1 byte), a logical address (2 bytes), a format reserved area (5 bytes), a discrete information ECC (2 bytes), and a data ECC (3 bytes). The discrete information ECC is error correction data for the management flag, the logical address, and the format reservation. The data ECC is error correction data for the 512-byte data.

In the management flag byte, a system flag (1=user block, 0=boot block), a conversion table flag (1=invalid, 0=table block), a copy inhibit specification (1=not prohibited, 1=prohibited), and an access permission (1=free, 0=read protected) are recorded.

The first two blocks of each segment, namely block 0 and block 1, form a boot block. Block 1 is a backup with the same data as block 0. The boot block is the first valid block in the memory card and therefore is accessed before all other blocks when the memory card is loaded in a device. The remaining blocks are user blocks. The first page (Page 0) of the boot block stores a header, a system entry, and boot and attribute information. Page 1 stores data about unusable blocks. Page 2 stores CIS (Card Information Structure)/IDI (Identity Drive Information). The header of the boot block records a boot block ID and the number of valid entries in the boot block. The system entry records the start position of use-inhibited block data, the size thereof, the type thereof, the data start position of CIS/IDI, the size thereof, and the type thereof.

The boot and attribute information records the type of the memory card 40 (read only, readable and writable, or hybrid), a block size, a total number of blocks, security compliance, and data (date of manufacture and so on) associated with the production of the card.

Flash memories are subject to deterioration of the insulating film every time data is written; thereby limiting the number of times data can be written to the flash memory. Therefore, it is preferable to avoid accessing the same storage area (block) repeatedly and concentratedly. When rewriting data, having a logical address and stored at a physical address, the file system prevents data from being written to the same block; the file system writes updated data to an unused block. Consequently, the correlation between logical address and physical address changes after each update. This processing (called swap processing) can prevent repeated and concentrated access to the same block, thereby increasing the useful life of the flash memory.

The logical address stays associated with the data, so that, the data changes blocks during an update, the same address is seen by the FAT; ensuring proper access thereafter. Swap processing causes a change in the correlation between logical and physical addresses, so that a logical-physical address conversion table is required. Looking at this conversion table identifies the physical address corresponding to the logical address specified by the FAT, thereby enabling access to the block indicated by the identified physical block.

The logical-physical address conversion table is stored by DSP 30 into SRAMs 31 and 36. If these SRAMs do not have enough space to store the table, it can be stored in the flash memory. This table lists logical addresses (2 bytes each) in ascending order along with their corresponding physical addresses. Since the maximum size of the flash memory is 128 MB (8,192 blocks), 8,192 addresses may be represented. In addition, the logical-physical address conversion table is managed for each segment, the size of the table increasing as the size of the flash memory increases. For example, if the size of the flash memory is 8 MB (2 segments), 2 pages of each segment are used for the logical-physical address conversion table.

When storing the logical-physical address conversion table into the flash memory, a predetermined bit of the management flag in the redundant part of each page indicates the block in which the table is stored.

The above-mentioned memory card is usable by the FAT system used in personal computers and disc storage media.

Although not shown in FIG. 5, the memory card contains an IPL area, a FAT area, and a root directory area arranged on the flash memory. The IPL area stores the address of the program loaded first into the memory and various information about the memory. The FAT area stores information associated with the blocks (clusters). The FAT specifies values indicative of unused blocks, a next block number, a defective block, and a last block. The root directory area stores directory entries (file attribute, update date, start cluster, and file size).

In the present embodiment, apart from the file management system specified by the format of the above-mentioned memory card, a reproduction management file is provided for managing the tracks of a music file and the parts constituting each track. This reproduction management file is stored by the user block of the memory card into the flash memory. Consequently, if the FAT stored in the memory card is damaged, file recovery is ensured.

The reproduction management file is created by the DSP. For example, when the recorder is powered on for the first time, it is determined whether the memory card is loaded. If the memory card is loaded, authentication is executed. If the memory card is found to be a compliant memory card, the boot block of the flash memory is read into the DSP. Then, the logical-physical address conversion table is read. The read data is stored in the SRAMs. If the memory card is virgin to the user, the FAT and the root directory are written to the flash memory before shipment. The reproduction management file is created when data is recorded by the user.

Specifically, when a record command is given by the user to the DSP, the received audio data is compressed by the encoder/decoder IC and the resultant ATRAC3 data is encrypted by the security IC. The DSP records the encrypted ATRAC3 data onto the flash memory, after which the FAT and the reproduction management file are updated.

Every time a file update operation is executed (i.e., every time the recording of audio data is started and ended,) the FAT and the reproduction management file are rewritten on the SRAMs. Then, when the memory card is detached from the recorder or when it is powered off, the last FAT and reproduction management files are stored from the SRAMs into the flash memory. In this case, the FAT and reproduction management files may be overwritten every time the recording of audio data is started and ended. When the audio data has been edited, the contents of the reproduction management file is updated.

Further, the present embodiment also creates an additional information file in the flash memory. It should be noted that this additional information file may be part of or separate from the reproduction management file.

The additional information is given to the DSP from an external controller through the bus and the bus interface 32. The DSP records the received additional information to the flash memory. The additional information does not go through the security IC, so it is not encrypted. The additional information is written from the SRAM of the DSP to the flash memory when the memory card is detached from the recorder or when it is powered off.

3-2. Directory Structure

Figure 6:
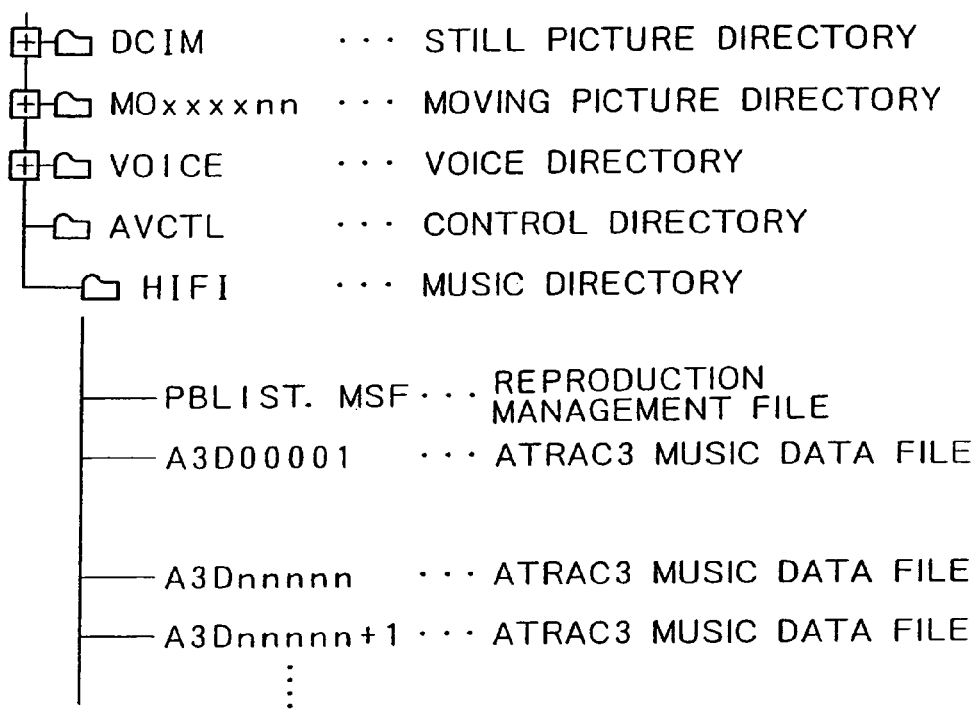
FIG. 6 is a diagram showing the directory structure used in the memory card shown in FIG. 3.

FIG. 6 shows a directory structure of memory card 40. As shown, a root directory is followed by a still picture directory, a moving picture directory, a voice directory, a control directory, and a music directory (HIFI). For exemplary purposes, the following description will describe recording/reproduction of music using the music directory.

The music directory has two types of files. One is a reproduction management file PBLIST.MSF (hereafter simply referred to as PBLIST). The other is an ATRAC3 data file A3Dnnnn.MSA (hereafter simply referred to as A3Dnnn) that stores encrypted music data.

There can be up to 400 ATRAC3 data files. Each ATRAC3 data file is created, then registered in the reproduction management file.

3-3. Management Structure and Editing Scheme

Figure 7:
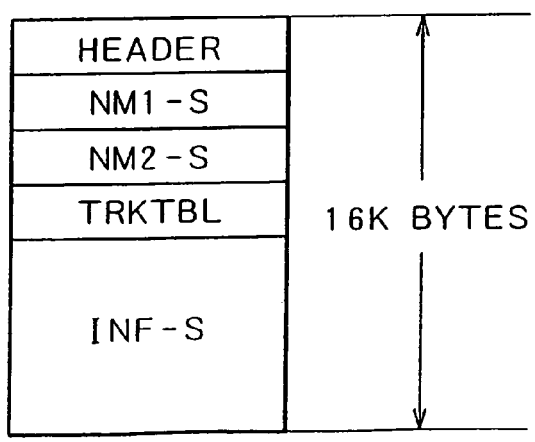
FIG. 7 is a diagram showing the configuration of a reproduction management file used in the memory card shown in FIG. 3.

FIG. 7 shows the structure of the reproduction management file. The reproduction management file has a fixed length of 16 KB and is composed of a header, a 1-byte memory card name HM1-S, a 2-byte code memory card name NM2-S, a reproduction table TRKTBL listing a sequence in which pieces of music are arranged, and additional information INF-S for the entire memory card.

Figure 8:
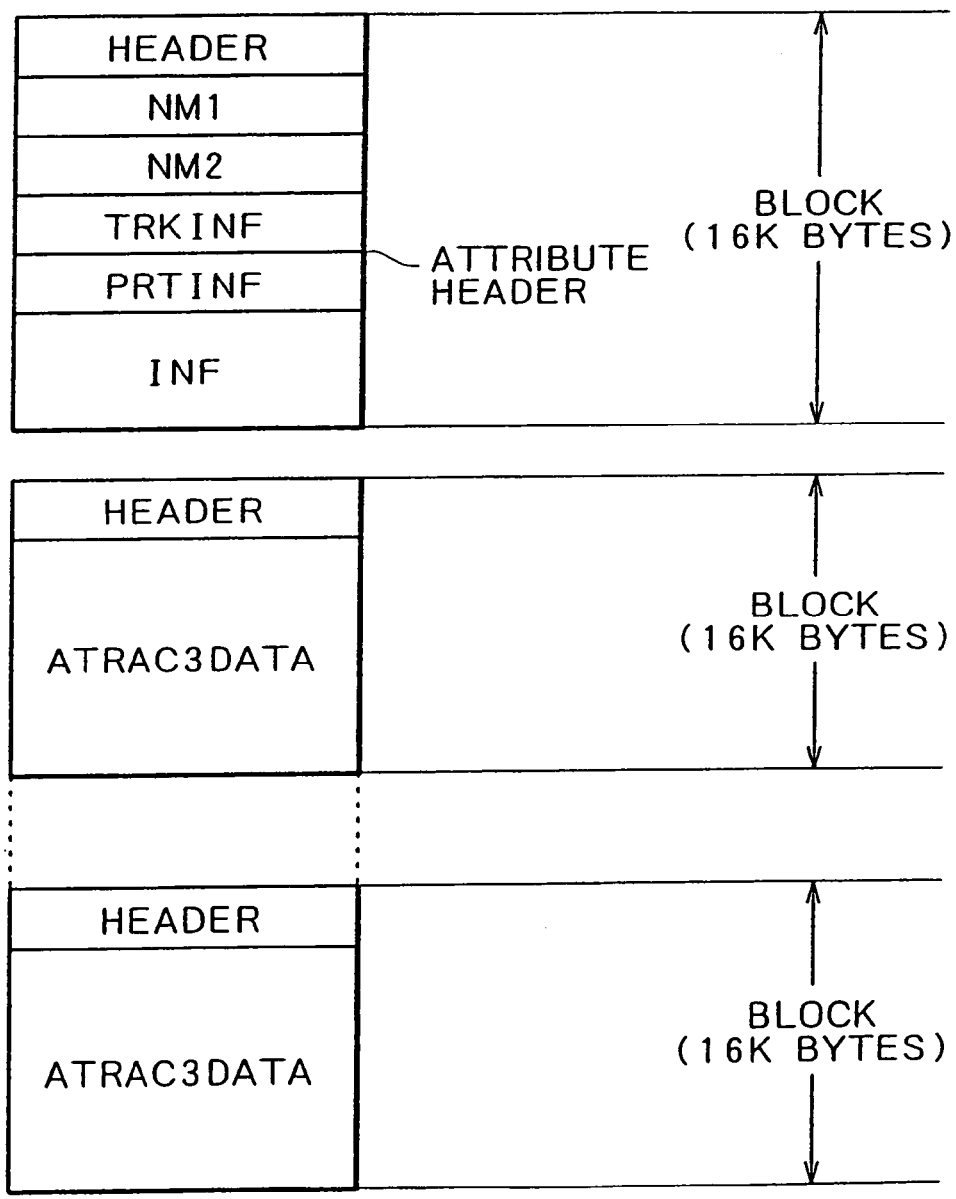
FIG. 8 is a diagram showing the configuration of an ATRAC3 music data file.

FIG. 8 shows the structure of an ATRAC3 data file (for one piece of music). The ATRAC3 data file (hereafter simply referred to as a data file) is provided for every piece of music and composed of an attribute header followed by the encrypted music data. The attribute header has a fixed length of 16 KB and has a configuration like that of the reproduction management file.

As shown in FIG. 8, the attribute header at the beginning of the data file is composed of a header, a 1-byte code music name NM1, a 2-byte code music name NM2, track information TRKINF such as track key information, part information PRTINF, and track additional information INF. The header includes a total number of parts, name attribute, additional information size, and so on. In this data file, the attribute header is followed by the ATRAC3 music data. The music data is divided into 16-KB blocks, each block beginning with a header. The header includes an initial value for decrypting the encrypted data. It should be noted that encryption is performed only on the music data.

Figure 9:
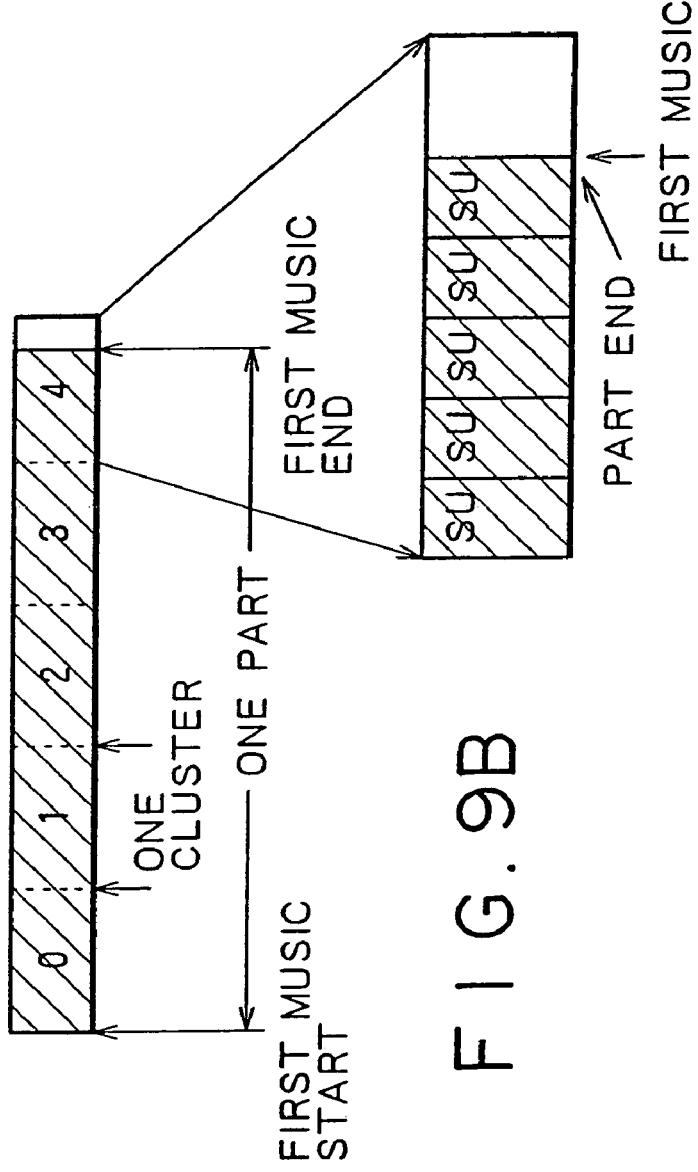
FIGS. 9A–C are diagrams showing configurations of data files used in one embodiment of the invention.

Referring to FIGS. 9A, 9B, and 9C, the relation between the music (track) and an ATRAC3 data file will be described. One track denotes one piece of music, and is made up of one ATRAC3 data file (refer to FIG. 8). The ATRAC3 data file stores audio data compressed by the ATRAC3 scheme.

Data is recorded on the memory card on a cluster basis. Each cluster is 16 KB. No cluster has more than a single file. The minimum unit by which the flash memory is erased is one block. In the case of a memory card for use in recording music data, a block and a cluster are synonymous and one cluster is defined as a sector.

One piece of music basically constitutes one part. When a piece of music is edited, it may constitute two or more parts. A part denotes a unit of data recorded in a continuous time from the beginning of recording to its end. Normally, one track constitutes one part.

The joints between parts are managed by part information PRTINF (to be described later) in the attribute header of each piece of music. To be more specific, a part size is indicated by 4-byte data called part size PRTSIZE in the PRTINF. The first two bytes of the part size PRTSIZE indicate the total number of clusters for that part. The subsequent bytes indicate the position of a start sound unit (abbreviated as SU) and an end SU in start and end clusters.

This part description scheme eliminates the necessity for moving large amounts data when editing music data. If music data is edited only on a block basis, unnecessary moving of data may be avoided; however, blocks are too large to efficiently use in editing.

The SU is the minimum unit of a part and the minimum data unit used when audio data is compressed using ATRAC3. Each SU contains several hundred bytes of data obtained by compressing audio data (1,024×16 bits×2 channels at 44.1 KHz) into 1/10 of its original size. One SU is equivalent to about 23 ms. Normally, one part is composed of as many as several thousand SUs. When one cluster is composed of 42 SUs, that cluster represents about one second of music. The number of parts constituting a track depends on the size of the additional information. The number of parts is determined by the number obtained by removing the header, music name, and additional information data from a block, so that the maximum number of parts (645) may be used.

FIGS. 9A, 9B, and 9C show a file configuration for two pieces of music continuously recorded from a CD. FIG. 9A shows a case in which one piece (data file #1) constitutes five clusters. FIG. 9C shows a case in which two pieces (data file #2) constitute six clusters. Since only one file can be stored in a cluster, data file #2 is created from the beginning of the next cluster. Consequently, if the end (the end of music 1) of data file #1 is located halfway into a cluster, no data is recorded in the remaining portion of that cluster as shown in FIG. 9B. In the above-mentioned example, each of data files #1 and #2 constitute one part.

For data files recorded on a memory card, four types of edit processing are specified; divide, combine, erase, and move. Divide processing divides one file in the file system into two and updates the reproduction management file. Combine processing combines two files in the file system into one and updates the reproduction management file. Erase processing erases a track. Move processing changes the sequence of the tracks and the reproduction management file is updated.

It should be noted that "move" processing does not involve the movement of data. Therefore, "move" in editing is different from moving data from one recording medium to another recording medium. As described, a "move" of data between recording media is achieved by copying the data and then deleting it from the source recording medium.

Figure 10:
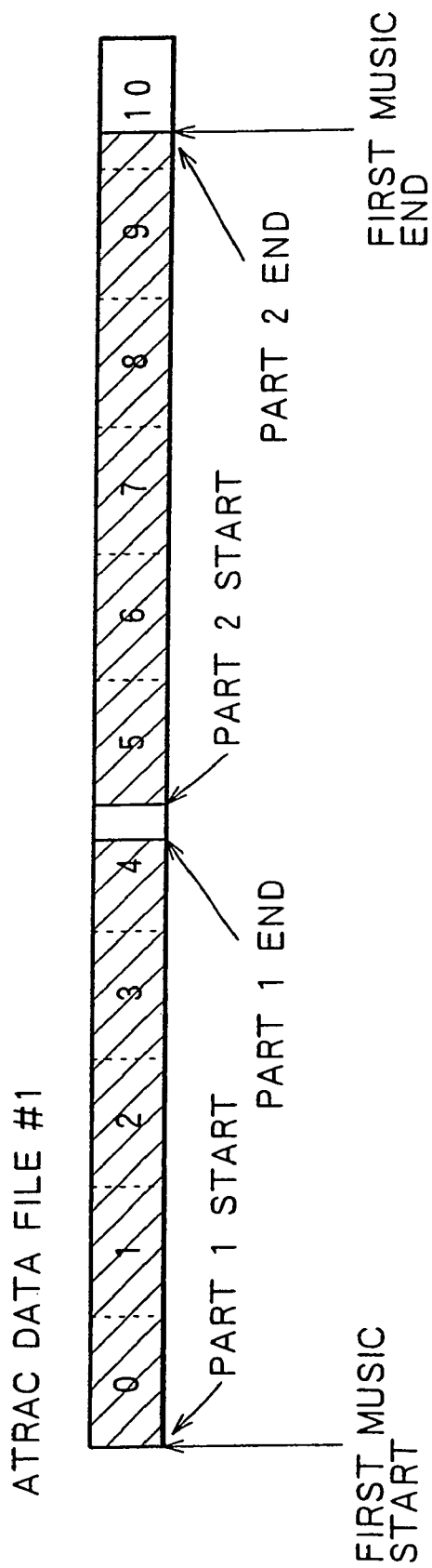
FIG. 10 is a diagram showing a combine edit process using the data files shown in FIGS. 9A–C.

A result of combining two files (data files #1 and #2 shown in FIGS. 9A, 9B, and 9C) is shown in FIG. 10. The two data files #1 and #2 are combined into new data file #1. New data file #1 is made up of two parts.

FIG. 11 shows the result of dividing one piece of music (data file #1 shown in FIG. 9A) midway in cluster 2. Divide processing results in data file #l made up of clusters 0 and 1 and a front portion of cluster 2 and data file #2 made up of a rear portion of cluster 2 and clusters 3 and 4.

As described, in the present embodiment, the part description scheme is provided, so that the start and end positions of part 1 and the start and end positions of part 2 can be specified by SU unit. Consequently, it becomes unnecessary to move the music data of part 2 to fill the joint resulted from the combine processing. In addition, the part description scheme makes it unnecessary to move the data so that the space at the beginning of data file #2 resulted from the divide processing (FIG. 11) is filled.

3-4. Reproduction Management File

FIG. 12 shows the detailed data configuration of the reproduction management file PBLIST. The reproduction management file PBLIST is one cluster (1 block=16 KB) in size. The first 32 bytes are a header.

The remaining portion contains a name NM1-S (256 bytes) for the entire memory card, a name NM2-S (512 bytes), a CONTENTS KEY, an MAC, an S-YMDhms, a table TRKTBL (800 bytes) for managing the sequence of reproduction, and additional information INF-S (14,720 bytes) for the entire memory card. At the end of this file, part of the information in the header is recorded again. The different data is located at predetermined positions in the reproduction management file.

In the reproduction management file, the first 32 bytes represented by (0×0000) and (0×0010) are the header. Note that every 16 bytes, from the beginning of the file, is called a slot.

"Reserved" denotes undefined data and is normally indicated by a null (0×00). The reserved data is ignored. The position of reserved data is also write-protected. Data denoted "Option" is handled in the same manner as reserved data. The header is arranged in the first and second slots and contains the following data.

BLKID-TL0 (4 bytes)

| | |
|---|---|
| Meaning: | block file ID. |
| Function: | a value for identifying the beginning of the reproduction management file. |
| Value: | "TL = 0" (for example, 0x544C2D30). |

MCcode (2 bytes)

| | |
|---|---|
| Meaning: | maker code. |
| Function: | the code for identifying the maker and the model of a device on which recording has been made. |
| Value: | high-order 10 bits (maker code) and low-order 6 bits (model code). |

REVISION (4 bytes)

| | |
|---|---|
| Meaning: | the number of times the reproduction management file (PBLIST) has been rewritten. |
| Function: | REVISION increments every time the reproduction management file has been rewritten. |
| Value: | starts from 0 and increments by one. |

SN1C + L (2 bytes)

| | |
|---|---|
| Meaning: | the attribute of the name (1 byte) of the memory card to be written to the NM1-S area. |
| Function: | SN1C + L represents a character code and a language code to be used in one byte each. |
| Value: | character code (C) identifies characters by a high-order byte as shown below: |
| | 00: no character code is set; handled simply as a binary number. |
| | 01: ASCII 02: ASCII + KANA 03: modified 8859-1 |
| | 81: MS-JIS 82: KS C 5601-1989 83: GB2312-80 90: S-JIS (for Voice). |
| | Language code (L) identifies languages by low-order 1 byte as per EBU Tech 3258 as shown below: |
| | 00: not set. 08: German 09: English 0A: Spanish 0F: French |
| | 15: Italian 1D: Dutch 65: Korean 69 Japanese 75: Chinese |

If there is no data, zeros are filled.

SN2C + L (2 bytes)

| | |
|---|---|
| Meaning: | the attribute of the name (2 bytes) of the memory card to be written to the NM2-S area. |
| Function: | SN2C + L represents a character code and a language code to be used in one byte each. |
| Value: | the same as the above-mentioned SN1C + L. |

SINFSIZE (2 bytes)

| | |
|---|---|
| Meaning: | the size obtained by adding all additional information associated with the entire memory card to be written to the INF-S area. |
| Function: | SINFSIZE describes a data size in a unit of 16 bytes; if there is no data, zeros are filled. |
| Value: | the size is from 0x0001 to 0x39C (924). |

T-TRK (2 bytes)

| | |
|---|---|
| Meaning: | total track number. |
| Function: | the number of total tracks. |
| Value: | 1 to 0x0190 (up to 400 tracks); if there is no data, zeros are filled. |

VerNo (2 bytes)

| | |
|---|---|
| Meaning: | the version number of the format. |
| Function: | high-order indicates major version number and low-order indicates minor version number. |
| Value: | example 0x0100 (Ver 1.0), 0x0203 (Ver 2.3) |

The data that follow the above-mentioned header are as follows:

NM1-S

| | |
|---|---|
| Meaning: | the name of one byte associated with the entire memory card. |
| Function: | variable-length name data (up to 256) represented in 1-byte character code. The name data always ends with a termination code (0x00). The size is counted from this termination code. If there is no data, a null (0x00) is recorded at least 1 byte from the beginning (0x0020). |
| Value: | various character codes. |

NM2-S

| | |
|---|---|
| Meaning: | the 2-byte name associated with the entire memory card. |
| Function: | the variable-length name data (up to 512) represented in a 2-byte character code. The name data always ends with a termination code (0x00). The size is counted from this termination code. If there is no data, a null (0x00) is recorded at least 2 bytes from the beginning (0x0120). |
| Value: | various character codes. |

CONTENTS KEY

| | |
|---|---|
| Meaning: | a value prepared for each piece of music. This value is protected by MG (M) and then stored. The value here is the same as the CONTENTS KEY attached to the first piece of music. |
| Function: | the key necessary for computation of MAC of S-YMDhms. |
| Value: | from 0 to 0xFFFFFFFFFFFFFFFF. |

MAC

| | |
|---|---|
| Meaning: | the value for checking for tamper of copyright information. |
| Function: | the value created from the contents of S-YMDhms and the CONTENTS KEY. |
| Value: | from 0 to 0xFFFFFFFFFFFFFFFF. |

TRK-nnn

| | |
|---|---|
| Meaning: | SQN (sequence) number of the ATRAC3 data file to be reproduced. |
| Function: | TRK-nnn describes FNo in TRKINF. |
| Value: | from 1 to 400 (0x190). If there is no data, zeros are filled. |

INF-S

| | |
|---|---|
| Meaning: | additional information data (for example, information about photograph, lyrics, and description) associated with the entire memory card. |
| Function: | variable-length additional information data accompanying a header. Two or more different pieces of additional information may be arranged, each being attached with ID and data size. Each piece of additional information data including a header is at least 16 bytes in integral multiples of 4 bytes. Details of this will be described later. |
| Value: | refer to the configuration of additional information data. |

S-YMDhms (4 bytes) (optional)

| | |
|---|---|
| Meaning: | Year, month, day, hour, minute and second of recording made by a device having a reliable clock. |
| Function: | the value for identifying the last recording date and time; essential for EMD. |
| Value: | bits 25 to 31: year 0 to 99 (1980 to 2079) |
| | bits 21 to 24: month 0 to 12 |
| | bits 16 to 20: day 0 to 31 |
| | bits 11 to 15: hour 0 to 23 |
| | bits 05 to 10: minute 0 to 59 |
| | bits 00 to 04: second 0 to 29 (in unit of 2 seconds) |

In the last slot of the reproduction management file, the same BLKID-TL0, MCode, and REVISION as those in the header are written.

As an example, in a consumer audio system, a memory card may be detached during recording or the system powered off inadvertently, thereby requiring detection of abnormal conditions upon recovery of the system. As described, REVISION is written at the beginning and end of each block and each time REVISION is written, the rewrite count is incremented by 1. Consequently, if an abnormal condition occurs while recording a block, the values of the beginning REVISION and end REVISION will not agree, thereby allowing for detection of the abnormal condition. Thus, the two REVISIONs allows for detection of abnormal conditions. When an abnormal condition is detected, an error message is displayed.

Because fixed value BLKID-TL0 is inserted at the beginning of each block, this fixed value may be used as a guide for repair of a damaged FAT. Specifically, by checking the fixed value at the beginning of each block the type of file can be determined. In addition, because this fixed value BLKID-TL0 is written to both the header and the end of each block, its reliability can be checked.

Compared with the reproduction management file, an ATRAC3 data file contains a fairly large amount of data (e.g., sometimes several thousand concatenated blocks). Each ATRAC3 data file has a block number BLOCK SERIAL attached. Normally, each ATRAC3 data file occupies two or more blocks on the memory card. Therefore, unless the content is identified by CONNUM0 and BLOCK SERIAL, duplication can occur, thereby making recovery difficult upon damage to the FAT.

Likewise, in case a file develops logic errors, a maker code (MCode) is recorded at the beginning and end of each block for identification of the model of the device on which the recording was made.

FIG. 13 shows the configuration of additional information data (INF-S) recorded in the reproduction management file. The additional information starts with a header, as shown below, followed by variable-length data.

| INF | |
|---|---|
| Meaning: | field ID. |
| Function: | a fixed value indicative of the beginning of additional information data. |
| Value: | 0x69. |

| ID | |
|---|---|
| Meaning: | an additional information key code. |
| Function: | ID indicates the classification of additional information. |
| Value: | from 0 to 0xFF. |

| SIZE | |
|---|---|
| Meaning: | the size of individual additional information. |
| Function: | the data size is free but must always be an integral multiple of 4 bytes and at least 16 bytes. If the data end with a space, it is filled with null (0x00). |
| Value: | from 16 to 14784 (0x39C0). |

| MCode | |
|---|---|
| Meaning: | maker code. |
| Function: | the code for identifying the maker and the model of a device on which recording has been made. |
| Value: | high-order 10 bits (maker code) and low-order 6 bits (model code). |

| C + L | |
|---|---|
| Meaning: | the attribute of characters to be written in a data area starting from byte 12. |
| Function: | a character code and a language code to be used is represented in 1 byte each. |
| Value: | same as the above-mentioned SN1C + L. |

| DATA | |
|---|---|
| Meaning: | individual additional information data. |
| Function: | DATA represents in variable-length data. The real data always starts from byte 12 and must be at least 4 bytes in length (size) and always an integral multiple of 4 bytes. If the data end with a space, it is filled with null (0x00). |
| Value: | individually defined according to contents. |

FIG. 14 shows an example of the correlation between additional information key code values 0 to 63 and additional information types. Key code values 0 to 31 are assigned to music-associated information (character information) and key code values 32 to 63 are assigned to URL (Uniform Resource Locator) internet-associated information. Character information such as album title, artist name, and CM is recorded as additional information.

FIG. 15 shows more examples of the correlation between additional information key code values (64 to 127) and additional information types. Key code values 64 to 95 are assigned as paths/other information and key code values 96 to 127 are assigned to control/numeric data. For example, in the case of ID 98, the additional information is TOC-ID. TOC-ID indicates a first music number, a last music number, current music number, a total playback time, and a playback time of the current music, as indicated by the TOC information from a CD (Compact Disc).

FIG. 16 shows still further examples of the correlation between additional information key code values (128 to 159) and additional information types. Key code values 128 to 159 are assigned to the information associated with synchronous reproduction. In FIG. 16, EMD denotes electronic music distribution.

In reference to FIGS. 17A, 17B, 17C, 17D, and 17E, specific examples of additional information data will be described. FIG. 17A shows a data structure of additional information data consistent with FIG. 13.

FIG. 17B shows an example in which the additional information is an artist's name, i.e. key code ID=3. SIZE is 0×1C (28 bytes). The data length of this additional information including the header is 28 bytes. Within C+L, the character code C is 0×01 and the language code L is 0×09. This value is an ASCII character code that indicates the language is English according to the specification shown above. The artist name data, "SIMON&ABCDEFGHI", for example is written in one byte starting from byte 12. Since the size of additional information is specified as an integral multiple of 4 bytes, the remaining one byte is (0×00).

FIG. 17C shows an example in which the additional information is ISRC (International Standard Recording Code: copyright code), i.e. key code ID=97. SIZE is 0×14 (20 bytes), indicating that the data length of this additional information is 20 bytes. For C+L, C=0×00 and L=0×00, indicating that neither character nor language is set; namely, the data is binary. Then, an 8-byte ISRC code is written as the data. ISRC indicates copyright information (country, copyright holder, recording date, and serial number).

FIG. 17D shows an example in which the additional information is a recording date, i.e. key code ID=97. SIZE is 0×10 (16 bytes), indicating that the data length of this additional information is 16 bytes. For C+L, C=0×00 and L=0×00, indicating that neither character nor language is set. Then, a 4-byte (32 bits) code is written as the data, indicating a recording date (year, month, day, hour, minute, second).

FIG. 17E shows an example in which the additional information is a reproduction log, i.e. key code ID=107. SIZE is 0×10 (16 bytes), indicating that the data length of this additional information is 16 bytes. For C+L, C=0×00 and L=0×00, indicating that neither character nor language is set. Then, a 4-byte (32 bits) code is written as the data, indicating a reproduction log (year, month, day, hour, minute, second). The reproduction log records 16 bytes of data every time reproduction is performed.

3-5. Data File

FIG. 18 shows a data array for an ATRAC3 data file (A3Dnnnn) in which one SU is N bytes (for example, N=384 bytes). FIG. 18 shows in detail a data file similar to that shown in FIG. 8. Specifically, the figure shows the start bytes (0×0000 through 0×7FF0) of the slots of the first two blocks (16×2=32K bytes).

The first 32 bytes of the attribute header are the header, followed by 256 bytes for music name area NM1 (256 bytes) and 512 bytes for music name area NM2 (512 bytes). The header of the attribute header includes the following data.

---
BLKID-HD0 (4 bytes)

Meaning: block file ID.
Function: a value for identifying the beginning of ATRAC3 data file.
Value: fixed value = "HD = 0" (for example, 0x48442D30).

MCode (2 bytes)

Meaning: maker code.
Function: the code for identifying the maker and the model of a device on which recording has been made.
Value: high-order 10 bits (maker code) and low-order 6 bits (model code).

BLOCK SERIAL (4 bytes)

Meaning: a serial number attached to each track.
Function: the first block starts with 0, subsequent blocks having serial numbers in increment of 1; these numbers remain unchanged after edit processing.
Value: from 0 to 0xFFFFFFFF.

N1C + L (2 bytes)

Meaning: the attribute of track (music name) data (NM1).
Function: a character code and a language code for use in NM1 are represented in 1 byte each.
Value: same as SN1C + L.

N2C + L (2 bytes)

Meaning: the attribute of track (music name) data (NM2).
Function: a character code and a language code for use in NM2 are represented in 1 byte each.
Value: same as SN1C + L.

INFSIZE (2 bytes)

Meaning: a size obtained by totaling all pieces of additional information associated with track.
Function: INFSIZE describes a data size in unit of 16 bytes. If there is no data, zeros are filled.
Value: the size is 0x0000 to 0x3C6 (966).

T-PRT (2 bytes)

Meaning: the total number of parts.
Function: T-PRT represents the number of parts constituting a track; normally 1.
Value: from 1 to 0x285 (645 dec).

T-SU (4 bytes)

Meaning: the total number of SUs.
Function: T-SU represents the actual total number of SUs in one track; equivalent to a music reproduction time.
Value: from 0x01 to 0x001FFFFF.

INX (2 bytes) (optional)

Meaning: the relative position of INDEX.
Function: the pointer indicative of the beginning of a characteristic portion of music, specifying the position from the beginning of music by a value obtained by dividing the number of SUs by 4; equivalent to a duration of time (about 93 ms) four times as long as normal SU.
Value: from 0 to 0xFFFF (up to about 6084 seconds).

XT (2 bytes) (optional)

Meaning: the reproduction time of INDEX.
Function: XT specifies the time to be reproduced from the beginning specified by INX-nnn by a value obtained by dividing the number SUs by 4; equivalent to a duration of time (about 93 ms) four times as long as a normal SU.
Value: 0x0000: no setting; from 0x01 to 0xFFFE (up to 6084 seconds).
0xFFFF: up to the end of music.

---

The following describes music name areas NM1 and NM2 in the attribute header.

---
NM1

Meaning: a character string indicative of music name.
Function: a variable-length music name (up to 256) represented in a 1-byte character code. The name data always end with a termination code (0x00). The size is computed from this termination code. If there is no data, one or more bytes of null (0x00) are recorded at least from the beginning (0x0020).
Value: each type of character code.

NM2

Meaning: a character string indicative of music name.
Function: variable-length name data (up to 512) represented in a 2-byte character code. The name data always end with a termination code (0x00). The size is computed from this termination code. If there is no data, two or more bytes of null (0x00) are recorded at least from the beginning (0x0120).
Value: each type of character code.

---

The 80-byte data starting from fixed position 0×0320 of the attribute header is called the track information area TRKINF, which manages information associated with security and copy control. The following describes the data in TRKINF.

---
CONTENTS KEY (8 bytes)

Meaning: a value prepared for each piece of music, which is protected by the security block of the memory card and then stored.
Function: a first key which becomes necessary for reproduction of music and used for computing C-MAC[n].
Value: from 0 to 0xFFFFFFFFFFFFFFFF.

C-MAC[n] (8 bytes)

Meaning: a value for checking for tamper of copyright information.
Function: a value created from the contents of plural TRKINFs including content accumulation number and a hidden sequence number. The hidden sequence number denotes a sequence number recorded in a hidden area of the memory card. Any recorder not compliant with copyright cannot read the hidden area. A dedicated recorder compliant with copyright or a personal computer installed with software capable of reading the memory card can access the hidden area.

A (1 byte)

Meaning: the attribute of a part.
Function: information such as a compression mode in a part.
Value: See FIG. 19. Monaural mode (N = 0, 1) is a special joint mode in which bit 7 is 1 and the sub signal is 0. Only the main signal (L + R) can be specified as monaural. Normal reproducing devices may ignore the information in bits 2 and 1.

Bit 0 of A forms information of emphasis on/off. Bit 1 forms information about reproduction SKIP or normal reproduction. Bit 2 forms information about data division; for example, audio data or other data such as FAX. Bit 3 is undefined. By combining bits 4, 5 and 6, rate information is specified as shown.

More specifically, N denotes a rate value represented in three bits, indicating recording time (in the case of a 64-MB memory card), data transfer rate, the number of SUs in one block, and the number of bytes of one SU for five types of modes; monaural (N=0), LP (N=2), SP (N=4), EX (N=5, 6), and HQ (n=7). Bit 7 indicates the mode (0: dual, 1: joint) of ATRAC3.

The following describes the case of SP mode by use of a 64-MB memory card. The 64-MB memory card has 3968 blocks. In the SP mode, one SU has 304 bytes, so that one block has 53 SUs. One SU is equivalent to (1,024/44,100) seconds. Therefore, one block is (1,024/44,100)×53×(3, 968−16)=4,863 seconds=81 minutes. The transfer rate is (44,100/1,024)×304×8=104,737 bps.

LT (1 byte)

| | |
|---|---|
| Meaning: | a reproduction limit flag (bit 7 and bit 6) and a security version (bit 5 through bit 0). |
| Function: | LT indicates that there is a limitation to this track. |
| Value: | bit 7: 0 = not limited; 1 = limited. |
| | bit 6: 0 = within limit of time; 1 = out of limit of time. |
| | bit 5 through bit 0: security version 0 (if security version is other than 0, reproduction is inhibited). |

FNo (2 bytes)

| | |
|---|---|
| Meaning: | a file number. |
| Function: | a track number at the first recording and this number identifies the position of a value for MAC computation recorded in the hidden area of the memory card. |
| Value: | from 1 to 0x190 (400). |

MG (D) SERIAL-nnn (16 bytes)

| | |
|---|---|
| Meaning: | the serial number of a security block (the security IC 20) of the recording device. |
| Function: | a unique value which is different between recording devices. |
| Value: | from 0 to 0xFFFFFFFFFFFFFFFFFFFFFFFFFFFFFFFF. |

CONNUM (4 bytes)

| | |
|---|---|
| Meaning: | a content accumulation number. |
| Function: | a unique value to be accumulated for each piece of music and managed by the security block of the recording device. This number is prepared for 2 to the 32nd power, or 4.2 billion pieces of music and is used for identifying recorded music. |
| Value: | from 0 to 0xFFFFFFFF. |

YMDhms-S (4 bytes) (optional)

| | |
|---|---|
| Meaning: | the reproduction start date for a track subject to reproduction limit. |
| Function: | the date on which reproduction start specified by EMD is permitted. |
| Value: | same as the notation of the above-mentioned date. |

YMDhms-E (4 bytes) (optional)

| | |
|---|---|
| Meaning: | the reproduction end date for a track subject to reproduction limit. |
| Function: | the date on which reproduction permission specified by EMD is ended. |
| Value: | same as the notation of the above-mentioned date. |

MT (1 byte) (optional)

| | |
|---|---|
| Meaning: | the maximum number of times reproduction is permitted. |
| Function: | the maximum number of reproduction times specified by EMD. |
| Value: | from 1 to 0xFF; 0x00 when this is not used. If bit 7 of LT is 0, the value of MT is 00. |

CT (1 byte) (optional)

| | |
|---|---|
| Meaning: | the number of times reproduction is made. |

-continued

| | |
|---|---|
| Function: | the number of times music can be actually reproduced within the permitted number of reproduction times. This value is decremented every time reproduction is made. |
| Value: | 0x00 to 0xFF; 0x00 when this is not used. If bit 7 of LT is 1 and the value of CT is 00, reproduction is inhibited. |

CC (1 byte)

| | |
|---|---|
| Meaning: | COPY CONTROL. |
| Function: | copy control. |
| Value: | as shown in FIG. 20, bit 6 and bit 7 represent copy control information, bit 4 and bit 5 represent copy control information associated with high-speed digital copy, and bit 1, bit 2, and bit 3 represent a copy attribute, bit 0 being undefined. |

Example of CC:

Bit 7: 0; copy protected, 1; copy enabled.
Bit 6: 0; original, 1; first generation or higher.
Bits 5, 4: 00; copy protected, 01; copy first generation, 10; copy enabled.
Bits 3, 2, 1: 001; content recorded from original source.
010; content copied from LCM.
011; content moved from LCM.
100 or higher; undefined.

It should be noted that LCM stands for Licensed Compliant Module, which is equivalent to the HDD in a personal computer or a consumer device. For example, in digital recording from a CD, (bits 7, 6) are 01, (bits 5, 4) are 00, and (bits 3, 2, 1) are 001 or 010.

CN (1 byte) (optional)

| | |
|---|---|
| Meaning: | the number of times copy is permitted in high-speed digital copy HSCMS (High Speed Serial Copy Management System). |
| Function: | CN extends distinction between copy once and copy free and specifies by the number of times; CN is valid only for first generation copy and decrements every time copy is made. |
| Value: 00: | copy protected, 01 to 0xFE: number of times, 0xFF: infinite number of times. |

In the attribute header in the data file, the above-mentioned track information area TRKINF is followed by 24-byte data starting from 0×0370 called a part information area PRTINF for part management. When one track is made up of plural parts, PRTINFs are arranged along the time axis. The following describes the data contained in PRTINF.

PRTSIZE (4 bytes)

| | |
|---|---|
| Meaning: | a part size. |
| Function: | PRTSIZE indicates the size of a part; cluster: 2 bytes (top), start SU: 1 byte (middle), end SU: 1 byte (bottom). |
| Value: | cluster: from 1 to 0x1F40 (8000), start SU: from 0 to 0xA0 (160), end SU: from 0 to 0xA0 (160) (SUs are numbered from 0). |

PRTKEY (8 bytes)

| | |
|---|---|
| Meaning: | a value for encrypting a part. |
| Function: | an initial value = 0; at the time of editing, PRTKEY follows editing rules. |
| Value: | from 0 to 0xFFFFFFFFFFFFFFFF. |

CONNUM0 (4 bytes)

| | |
|---|---|
| Meaning: | a first created content accumulation number key. |
| Function: | CONNUM0 serves as the ID for making content unique. |
| Value: | same as the content accumulation number initial value key. |

The attribute header of an ATRAC3 data file contains additional information INF as shown in FIG. 18. This information is generally the same as the additional information INF-S (refer to FIG. 12) in the reproduction management file except that the start position is not fixed. The additional information INF starts at the position next to the last byte portion (in units of 4 bytes) of one or more parts.

| INF | |
|---|---|
| Meaning: | the additional information data associated with tracks. |
| Function: | variable-length additional information data with header. Plural different kinds of additional information may be arranged. Each header is attached with ID and data size. The additional information data including individual headers are at least 16 bytes long and increment in an integral multiple of 4 bytes. |
| Value: | same as additional information INF-S in the reproduction management file. |

The above-mentioned attribute headers are followed by the data blocks to which the ATRAC3 data is recorded. As shown in FIG. 8, a header is attached to each block. The following describes the block data with reference to FIG. 18.

| BLKID-A3D (4 bytes) | |
|---|---|
| Meaning: | BLOCK ID FILE ID. |
| Function: | BLKID-A3D identifies the beginning of ATRAC3 data. |
| Value: | fixed value = "A3D" (for example, 0x41334420). |
| MCode (2 bytes) | |
| Meaning: | MAKER CODE |
| Function: | MCode identifies the maker and model of the device on which recording has been made. |
| Value: | high-order 10 bits (maker code); low-order 6 bits (model code). |
| CONNUM0 (4 bytes) | |
| Meaning: | a first created content accumulation number. |
| Function: | CONNUM0 serves as the ID for making content unique and allows no value change after editing. |
| Value: | same as the content accumulation number initial value key. |
| BLOCK SERIAL (4 bytes) | |
| Meaning: | a serial number attached to each track. |
| Function: | the first block starts with 0, subsequent blocks having serial numbers in increment of 1; these numbers remain unchanged after edit processing. |
| Value: | from 0 to 0xFFFFFFFF. |
| BLOCK-SEED (8 bytes) | |
| Meaning: | one key for encrypting one block. |
| Function: | the start block is a security block for the recording device and generates random numbers. The following blocks are numbered in increment of one. If this value is lost, no sound is outputted for about one second equivalent to one block. Therefore, the same value is written to the header and the block end in a duplicate manner. The value is not changed after editing. |
| Value: | initially, 8-byte random number. |
| INITIALIZATION VECTOR (8 bytes) | |
| Meaning: | this is an initial value necessary for encrypting and decrypting ATRAC3 data for each block. |
| Function: | the first block starts from 0 and the next block has a last encrypted 8-byte value of the last SU. When starting halfway in a divided block, the last 8 bytes immediately before the start SU are used. This value is not changed after editing. |
| Value: | from 0 to 0xFFFFFFFFFFFFFFFF. |
| SU-nnn | |
| Meaning: | sound unit data. |
| Function: | data obtained by compressing 1,024 samples. The number of bytes of the data depends on the compression mode used. |

-continued

| | The value is not changed after editing (for example, N = 384 bytes in SP mode). |
|---|---|
| Value: | ATRAC3 data value. |

In FIG. 18, N=384, so that 42 SUs are written to one block. The first two slots (4 bytes) of each block form a header. BLKID-A3D, MCode, CONNUM0, and BLOCK SERIAL are written to the last slot (2 bytes) in a duplicate manner. Therefore, the remaining area, M, of each block is 16,384−384×42−16×3=208 bytes. As described above, the 8-byte BLOCK SEED is written to this area M.

4. Content Source Identification Information

The following describes the content source identification information for example recording routes where content is recorded to the memory card 40, with reference to FIGS. 21, 22, and 23. The content supply source identification information is located in CC bits 1, 2, and 3 of the attribute header of an above-described data file (refer to FIGS. 18 and 20). In each example, recorders 1A and 1B are equivalent to recorder 1 shown in FIG. 1. Referring to FIGS. 21 through 23, a dashed line denotes the flow of content, while a solid line denotes the flow of identification information.

FIG. 21 shows data routes when content, such as music data, is reproduced by a reproduction apparatus 200, such as a CD player, and transmitted for recording in the memory card. Route 1 is formed when recorder 1B is connected to the reproduction apparatus. In this setup, the reproduction apparatus is connected to digital input selector 16 or line input selector 13 of the recorder (shown in FIG. 1) to supply digital audio data or analog audio data from the reproduction apparatus to the recorder.

The data, as content supplied from the reproduction apparatus, is encoded and encrypted in recorder 1B (as described with reference to FIG. 1) to be stored in the memory card. Each piece of music, or content, is recorded as one data file.

For this example, because the content is reproduced from a CD, which is a reproduction-only recording medium, the DSP of the recorder 1B generates "001" (as the values of bits 1, 2, and 3 of "CC") as the content supply source identification information. This value is recorded in the attribute header of the data file. As the content is recorded, the control information in the data file and the reproduction management file is also recorded and/or updated.

Route 2, shown in FIG. 21 is formed when recorder 1A incorporated in the apparatus 100 (e.g., a personal computer or an audio/visual apparatus) is connected to the reproduction apparatus. Digital audio data or analog audio data is then directly supplied to recorder 1A. The data supplied from the reproduction apparatus is encoded and encrypted in recorder 1A for recording in the memory card. In this case, CPU 101 generates "001" (as the value of bits 1, 2, and 3 of "CC") as the identification information of the content supply source and supplies the generated value to the recorder. By using "CC" and other supplied information, the recorder records the management information in the data file and records and/or updates the reproduction management file.

FIG. 22 shows the data routes where content from a CD-ROM drive 103 incorporated in personal computer 100 is recorded to memory card 40. Recorder 1B is in a stand-alone configuration and connects to the computer 100 by a USB port, or another communication scheme, through terminal 32 (shown in FIG. 1).

Route 3 is formed when content reproduced by the CD-ROM drive is first stored in HDD 201 and then is supplied from the HDD to the recorder. The content supplied from the HDD is copied or moved to the memory card. In this case, because the data is copied or moved from the HDD, the CPU 101 of the computer generates "010" or "011" for the value of bits 1, 2, and 3 of "CC" for the recorder and records this value in the attribute header of the data file.

Route 4, shown in FIG. 22, is formed when content reproduced by the CD-ROM drive 103 is supplied directly to the recorder. The content supplied from the CD-ROM drive is recorded to the memory card in the recorder. In this case, because the data is recorded directly from a CD, the CPU 101 generates "001" as the value of bits 1, 2, and 3 of "CC" for the recorder and records this value to the attribute header of the data file.

FIG. 23 shows the case in which the personal computer downloads content provided by a server 300 into the HDD through a general communication line, such as ISDN, a satellite communications line, or any other transmission path. The recorder 1B is connected to the computer through terminal 32 (shown in FIG. 1) by USB port or another communication scheme. The content provided by the server and stored in the HDD is supplied to the recorder. In this case, the content supplied from the HDD 102 is copied or moved to the memory card. Because the data is copied or moved from the HDD, the CPU 101 generates "010" or "011" for the value of bits 1, 2, and 3 of "CC" for the recorder and records this value in the attribute header of the data file.

As described previously, values of "100" and higher are undefined. It should be noted that the examples shown in FIGS. 21, 22, and 23 are only typical examples among various content recording routes; therefore, many other routes are possible. In each example, the values of bits 1, 2, and 3 of "CC" that provide the identification information for the content supply source are transmitted to the recorder from the apparatus from which the content has been supplied or are generated by the DSP in the recorder.

5. Enabling and Disabling Editing

The following describes the editing process for content recorded on the memory card. Data file editing includes both the file combine and divide operations.

These edit operations allow the user to manipulate content (e.g., music) as desired. However, from the standpoint of content providers, free manipulation of the content supplied by them is sometimes not desired. Therefore, the present embodiment sets limits to the content combine and divide operations that can be executed by the user.

Figure 24:
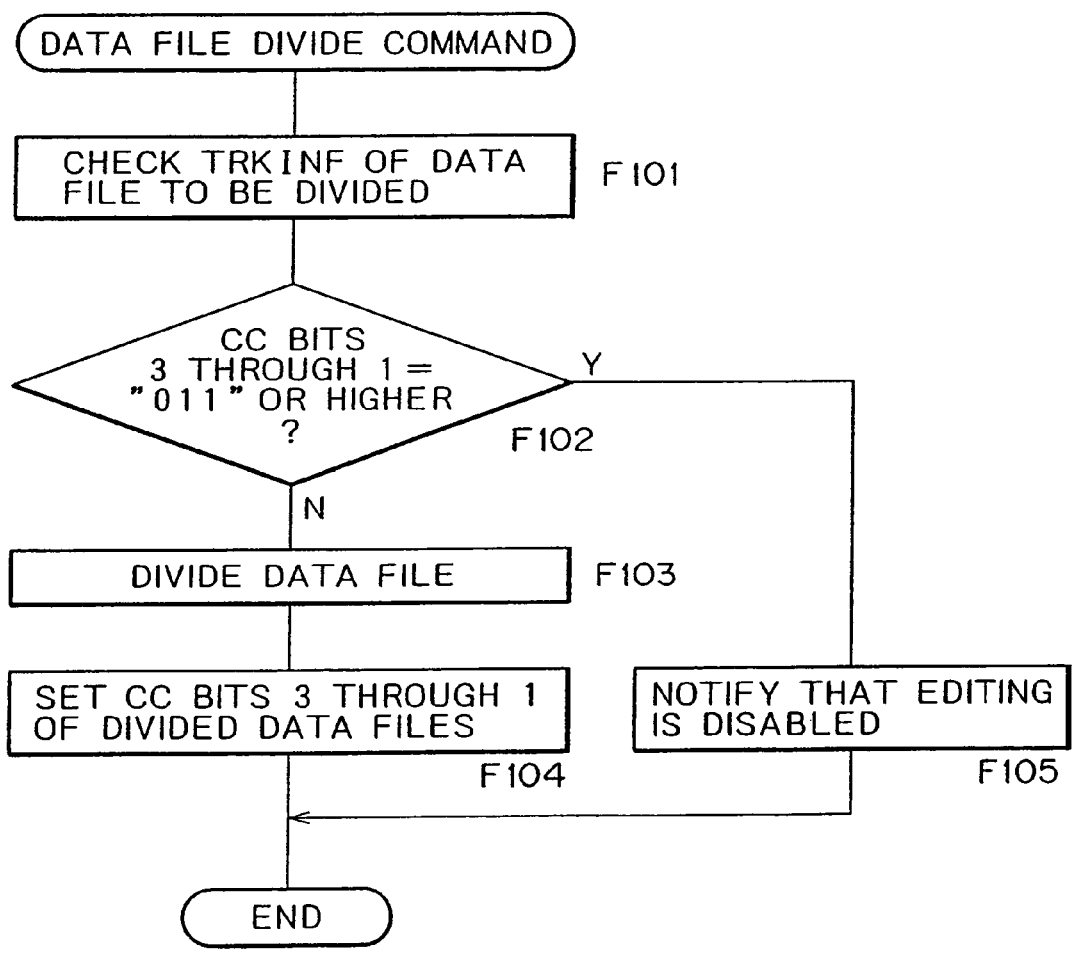
FIG. 24 is a flowchart of the editing process for dividing a data file.

FIG. 24 shows the processing executed by DSP 30 when the user has performed a data file divide operation on the recorder. When dividing a data file, the user first specifies a data file recorded on the memory card and then specifies certain divide operations, including specification of a dividing point and execution of the division. It should be noted that the user can execute these operations from operating block 39 (shown in FIG. 1) or the operating block of a master apparatus connected to terminal 32.

When a data file to be divided has been specified by the user, the DSP checks track information area TRKINF in the attribute header of the specified data file in step F101. Specifically, the DSP checks the CC values, i.e., the content supply source of this data file. If the CC value bits 1, 2, and 3 are not "011" or higher, namely if they are "001" or "010", then the system goes from step F102 to F103 to divide the data file. The data file is divided at the dividing point specified by the user into two data files as described with reference to FIG. 11. Actually, the division is realized by updating the reproduction management file and setting the attribute headers of the two divided data files. At this point, as shown in step F104, the CC values of the attribute headers of the divided files are set the same as the CC value of the data file before division.

On the other hand, if the CC bit values 1, 2, and 3 are "011" or higher in step F102, the system goes to step F105 to notify the user that the editing process is disabled and is therefore not executed. For such notification, the system issues a message, which is shown in display device 33 (shown in FIG. 1) or on the display device of the apparatus connected through terminal 32. Alternatively, the system notifies the user in the form of an alarm sound or an alarm message.

In the present embodiment, content recorded from an original source such as a CD or content copied from a HDD can be divided. However, content moved from a HDD is disabled for division.

The content moved from a HDD—namely, content of which CC bits 1, 2, and 3 are "011" or higher—is what was recorded from a server or another source to the HDD and then moved to the memory card. From the standpoint of the server and the content copyright holder, the editing of such content must be limited. Therefore, in the present embodiment, dividing is disabled in the case where the manipulation of content is intended to be limited.

Figure 25:
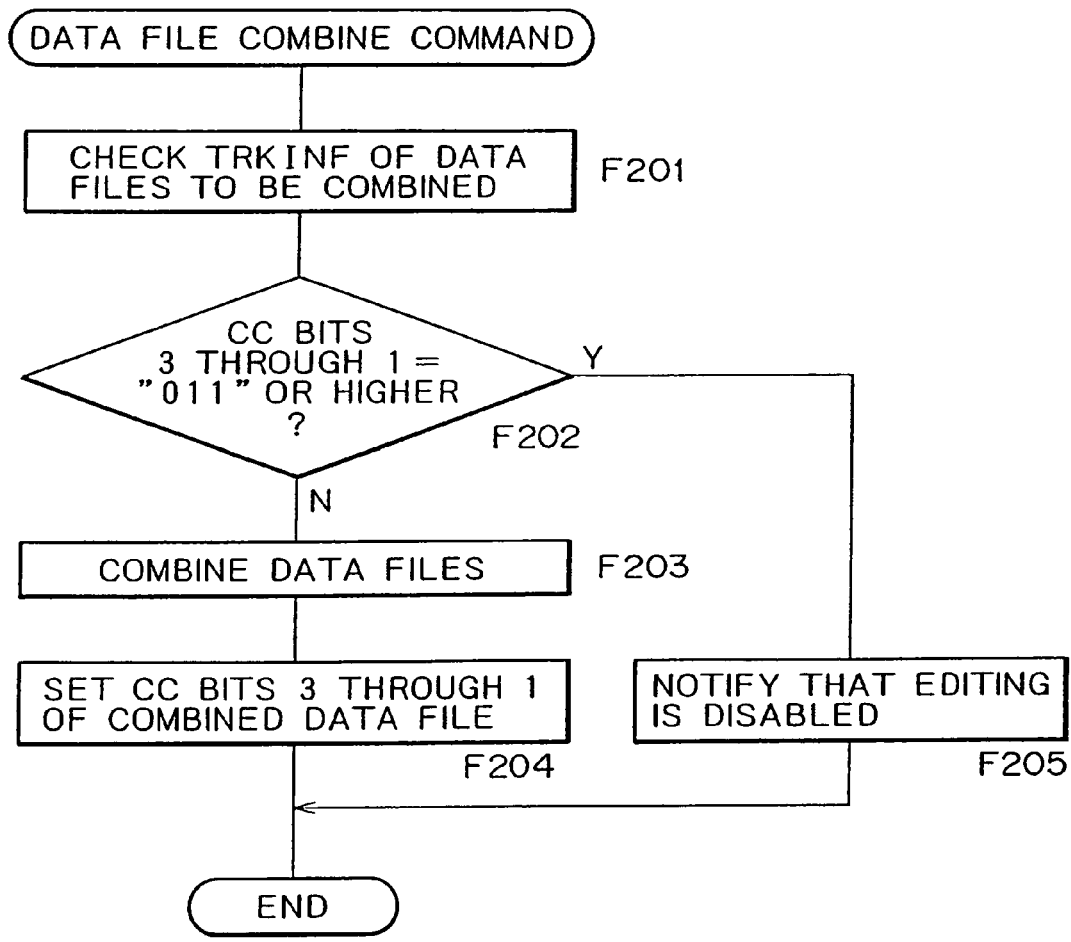
FIG. 25 is a flowchart of the editing process for combining data files.

FIG. 25 shows the processing by the DSP to be executed when a data file combine operation has been specified by the user. The user first specifies two data files recorded in the memory card to be combined and gives a command for combining the two data files.

When the two data files to be combined have been specified, the DSP checks the track information area TRKINF in the attribute headers of these files in step F201. Namely, the DSP checks the content supply source from the CC values of both data files. If the CC bits 1, 2, and 3 of both data files are not "011" or higher, namely the CC bits are "001" or "010", the system goes from step F202 to step F203 to execute the data file combination. The combination is realized by updating the management information, such as updating the reproduction management file and setting the attribute header of the combined data file.

It should be noted that the CC value of the attribute header of the combined data file is the same as the CC values of the two data files before being combined as shown in step F204. On the other hand, if the CC bits 1, 2, and 3 of any of the two data files are "011" or higher, the system goes to step F205 and notifies the user that the editing process is disabled and does not execute the combine process. The system notifies the user thereof in the same manner as in the above-mentioned divide processing.

In the present embodiment, the processing shown in FIG. 25 enables the combine process for content recorded from an original source such as a CD or content copied from a HDD, but disables the combine process for content moved from a HDD.

The examples of the above-mentioned embodiment of the invention are illustratively only. Various other system configurations, recorder configurations, and processing schemes are possible. For example, in the above examples, the edit processing is enabled when CC="001" and "010". It will be apparent to those skilled in the art the edit processing may also be enabled when CC="011".

As also described above, values of CC="100" or higher may be specified for indicating future content providers. In the present invention, various permission/prohibition conditions may be set according to the types of content providers. For example, for content supplied through a transmission path, CC can be set to "100" or the edit process may be disabled only when CC="100".

In the above examples, description has been made by assuming the content is audio data. It will be apparent to those skilled in the art that the present invention is also applicable to video data and text data, etc. . . .

As described and according to the invention, identification information indicative of a content supply source is recorded on a recording medium in correspondence with the recorded content supplied from that source. When editing of the recorded content is requested by the user, the identification information of the content to be edited is checked and the content editing is enabled or disabled according to the content supply source identified by the identification information. Consequently, the present invention can control the permission and inhibition of content editing according to content supply sources, thereby providing appropriate control of permission and inhibition of content editing in accordance with various content supply sources.

For example, if the content supply source is found to be a server connected through a communication line, the execution of content editing is disabled, thereby providing a practical advantage of respecting the intentions of content servers and content copyright holders. At the same time, if reproduction-only disc media, which are enabled for editing, are the content supply sources, users are allowed to edit content supplied from these media.

While the preferred embodiments of the present invention have been described using specific terms, such description is for illustrative purposes only, and it is to be understood that changes and variations may be made without departing from the spirit or scope of the appended claims.

What is claimed is:

1. An apparatus for controlling reproduction of data stored in a data area, comprising:
    data storing means for storing data and corresponding identification information in the data area, the identification information identifying a source of supply for the corresponding data stored in the data area; and
    control means for controlling reproduction of the data based on whether the identification information identifies whether the source of supply for the data stored in the data area is an original source.

2. The apparatus according to claim 1, wherein the identification information identifies whether the source of supply of the data is a read-only storage medium.

3. The apparatus according to claim 1, wherein the identification information identifies whether said source of supply of said data is a reproduction-only medium.

4. The apparatus according to claim 1, wherein the identification information identifies whether the source of supply for the data stored in the data area is a recorder which recorded the data from a compact disc.

5. The apparatus according to claim 1, wherein the identification information identifies whether the source of supply for the data stored in the data area is a server which distributed the data across a network.

6. The apparatus according to claim 1, wherein the identification information identifies whether the source of supply for the data stored in the data area is a licensed compliant module.

7. The apparatus according to claim 6, wherein the identification information identifies whether the data stored in the data area is checked out from the licensed compliant module.

8. A method of controlling reproduction of data stored in a data area of an apparatus, comprising the steps of:
    storing data and corresponding identification information in the data area, the identification information identifying a source of supply for the corresponding data stored in the data area; and
    controlling reproduction of the data based on whether the identification information identifies whether the source of supply for the data stored in the data area is an original source.

9. The method according to claim 8, wherein the identification information identifies whether the source of supply of the data is a read-only storage medium.

10. The method according to claim 8, wherein the identification information identifies whether the source of supply of the data is a reproduction-only medium.

11. The method according to claim 8, wherein the identification information identifies whether the source of supply for the data stored in the data area is a recorder which recorded the data from a compact disc.

12. The method according to claim 8, wherein the identification information identifies whether the source of supply for the data stored in the data area is a server which distributed the data across a network.

13. The method according to claim 8, wherein the identification information identifies whether the source of supply for the data stored in the data area is a licensed compliant module.

14. The method according to claim 13, wherein the identification information identifies whether the data stored in said data area is checked out from the licensed compliant module.

* * * * *